United States Patent
Lewis et al.

(10) Patent No.: US 12,172,379 B2
(45) Date of Patent: Dec. 24, 2024

(54) CLEANING SYSTEM FOR ADDITIVE MANUFACTURING

(71) Applicants: General Electric Company, Schenectady, NY (US); Unison Industries, LLC, Jacksonville, FL (US)

(72) Inventors: James Patrick Lewis, Dayton, OH (US); Johnny DeLeon, Mason, OH (US); Brian Paul Sechrist, Centerville, OH (US); Mary Kathryn Thompson, Fairfield Township, OH (US); Christopher David Barnhill, Cincinnati, OH (US); Meredith Elissa Dubelman, Liberty Township, OH (US)

(73) Assignees: General Electric Company, Evendale, OH (US); Unison Industries, LLC, Jacksonville, FL (US)

( * ) Notice: Subject to any disclaimer, the term of this patent is extended or adjusted under 35 U.S.C. 154(b) by 0 days.

(21) Appl. No.: 17/883,940

(22) Filed: Aug. 9, 2022

(65) Prior Publication Data
US 2023/0051575 A1 Feb. 16, 2023

Related U.S. Application Data

(60) Provisional application No. 63/231,966, filed on Aug. 11, 2021.

(51) Int. Cl.
*B29C 64/35* (2017.01)
*B08B 3/12* (2006.01)
(Continued)

(52) U.S. Cl.
CPC ............... *B29C 64/35* (2017.08); *B08B 3/12* (2013.01); *B08B 5/02* (2013.01); *B08B 3/02* (2013.01);
(Continued)

(58) Field of Classification Search
CPC ....... B08B 9/0328; B08B 3/02; B08B 9/0321; B08B 3/10; B08B 9/0323; B08B 5/02;
(Continued)

(56) References Cited

U.S. PATENT DOCUMENTS 2,910,390 A 10/1959 Gruettner et al.
4,575,330 A 3/1986 Hull
(Continued)

FOREIGN PATENT DOCUMENTS

DE 102004053719 B3 4/2006
EP 2505341 A1 10/2012
(Continued)

OTHER PUBLICATIONS

Amazon, Convenience Concepts, Convenience Concepts 4-Tier Plant Stand. (Website Only) https://www.amazon.com/gp/product/B00LN7M6FO/ref=s9_acsd_zgift_hd_bw_b12Yll_c_x_w?pf_rd_m=ATVPDKIKX0DER&pf_rd_s=merchandised-search-8&pf_rd_r=D5YXP4DZ92ZNASF01MIH&pf_rd_t=101&pf_rd_p=d00c4aa4-6803-5be8-a81b-8c97f5da238d&pf_rd_i=15383751.
(Continued)

*Primary Examiner* — Benjamin L Osterhout
(74) *Attorney, Agent, or Firm* — Dority & Manning, P.A.

(57) ABSTRACT

A cleaning system for an additively manufactured component includes a tank storing a cleaning fluid. A fluid circuit is operably coupled with the tank. A pump is coupled with the fluid circuit. A manifold is configured to receive fluid from the fluid circuit through the pump. At least one of a coupler defined by the manifold or a hose is coupled with the manifold. The at least one of the coupler defined by the manifold or the hose is further configured to couple with said additively manufactured component.

14 Claims, 16 Drawing Sheets

(51) Int. Cl.
  *B08B 5/02* (2006.01)
  *B08B 3/02* (2006.01)
  *B08B 3/10* (2006.01)
  *B08B 5/04* (2006.01)
  *B08B 9/023* (2006.01)
  *B08B 9/032* (2006.01)
  *B22F 10/68* (2021.01)
  *B33Y 40/20* (2020.01)

(52) U.S. Cl.
  CPC .............. *B08B 3/10* (2013.01); *B08B 3/102* (2013.01); *B08B 5/04* (2013.01); *B08B 9/023* (2013.01); *B08B 9/0321* (2013.01); *B08B 9/0323* (2013.01); *B08B 9/0328* (2013.01); *B22F 10/68* (2021.01); *B33Y 40/20* (2020.01); *Y02P 10/25* (2015.11)

(58) Field of Classification Search
  CPC .. B08B 9/023; B08B 3/12; B08B 5/04; B08B 3/102; B29C 64/35; B22F 10/68; B33Y 40/20; Y02P 10/25
  See application file for complete search history.

(56) References Cited

U.S. PATENT DOCUMENTS

| | | |
|---|---|---|
| 4,752,498 A | 6/1988 | Fudim |
| 5,026,146 A | 6/1991 | Hug et al. |
| 5,031,120 A | 7/1991 | Pomerantz et al. |
| 5,038,014 A | 8/1991 | Pratt et al. |
| 5,088,047 A | 2/1992 | Bynum |
| 5,096,530 A | 3/1992 | Cohen |
| 5,104,592 A | 4/1992 | Hull et al. |
| 5,126,529 A | 6/1992 | Weiss et al. |
| 5,143,663 A | 9/1992 | Leyden et al. |
| 5,171,490 A | 12/1992 | Fudim |
| 5,174,931 A | 12/1992 | Almquist et al. |
| 5,182,055 A | 1/1993 | Allison et al. |
| 5,192,559 A | 3/1993 | Hull et al. |
| 5,203,944 A | 4/1993 | Prinz et al. |
| 5,204,055 A | 4/1993 | Sachs et al. |
| 5,207,371 A | 5/1993 | Prinz et al. |
| 5,216,616 A | 6/1993 | Masters |
| 5,236,637 A | 8/1993 | Hull |
| 5,248,456 A | 9/1993 | Evans, Jr. et al. |
| 5,256,340 A | 10/1993 | Allison et al. |
| 5,258,146 A | 11/1993 | Almquist et al. |
| 5,303,141 A | 4/1994 | Batchelder et al. |
| 5,340,656 A | 8/1994 | Sachs et al. |
| 5,352,405 A | 10/1994 | Bearman et al. |
| 5,387,380 A | 2/1995 | Cima et al. |
| 5,432,045 A | 7/1995 | Narukawa et al. |
| 5,447,822 A | 9/1995 | Hull et al. |
| 5,454,069 A | 9/1995 | Knapp et al. |
| 5,496,682 A | 3/1996 | Quadir et al. |
| 5,573,721 A | 11/1996 | Gillette |
| 5,626,919 A | 5/1997 | Chapman et al. |
| 5,650,260 A | 7/1997 | Onishi |
| 5,660,621 A | 8/1997 | Bredt |
| 5,665,401 A | 9/1997 | Serbin et al. |
| 5,678,584 A | 10/1997 | O'Brien |
| 5,697,043 A | 12/1997 | Baskaran et al. |
| 5,718,279 A | 2/1998 | Saoth et al. |
| 5,807,437 A | 9/1998 | Sachs et al. |
| 5,851,465 A | 12/1998 | Bredt |
| 5,940,674 A | 8/1999 | Sachs et al. |
| 5,970,674 A | 8/1999 | Sachs et al. |
| 5,985,204 A | 11/1999 | Otsuka et al. |
| 6,051,179 A | 4/2000 | Hagenau |
| 6,146,567 A | 11/2000 | Sachs et al. |
| 6,149,856 A | 11/2000 | Zemel et al. |
| 6,193,923 B1 | 2/2001 | Leyden et al. |
| 6,200,514 B1 | 3/2001 | Meister |
| 6,200,646 B1 | 3/2001 | Neckers et al. |
| 6,206,672 B1 | 3/2001 | Grenda |
| 6,363,606 B1 | 4/2002 | Johnson et al. |
| 6,376,148 B1 | 4/2002 | Liu et al. |
| 6,401,002 B1 | 6/2002 | Jang et al. |
| 6,403,002 B1 | 6/2002 | van der Geest |
| 6,436,520 B1 | 8/2002 | Yamamoto |
| 6,471,800 B2 | 10/2002 | Jang et al. |
| 6,500,378 B1 | 12/2002 | Smith |
| 6,596,224 B1 | 7/2003 | Sachs et al. |
| 6,660,208 B2 | 12/2003 | Hanna |
| 6,663,718 B1 | 12/2003 | Mush |
| 6,780,368 B2 | 8/2004 | Liu et al. |
| 6,838,035 B1 | 1/2005 | Ederer et al. |
| 6,850,334 B1 | 2/2005 | Gothait |
| 6,896,839 B2 | 5/2005 | Kubo et al. |
| 6,916,441 B2 | 7/2005 | Newell et al. |
| 6,930,144 B2 | 8/2005 | Oriakhi |
| 6,966,960 B2 | 11/2005 | Boyd et al. |
| 6,986,654 B2 | 1/2006 | Imiolek et al. |
| 7,008,209 B2 | 3/2006 | Iskra et al. |
| 7,034,246 B2 | 4/2006 | Muylaert et al. |
| 7,052,263 B2 | 5/2006 | John |
| 7,087,109 B2 | 8/2006 | Bredr et al. |
| 7,195,472 B2 | 3/2007 | John |
| 7,270,528 B2 | 9/2007 | Sherwood |
| 7,300,613 B2 | 11/2007 | Sano et al. |
| 7,438,846 B2 | 10/2008 | John |
| 7,455,804 B2 | 11/2008 | Patel et al. |
| 7,520,740 B2 | 4/2009 | Wahlstrom et al. |
| 7,550,518 B2 | 6/2009 | Bredt et al. |
| 7,578,958 B2 | 8/2009 | Patel et al. |
| 7,614,866 B2 | 11/2009 | Sperry et al. |
| 7,636,610 B2 | 12/2009 | Schillen et al. |
| 7,767,132 B2 | 8/2010 | Patel et al. |
| 7,783,371 B2 | 8/2010 | John et al. |
| 7,785,093 B2 | 8/2010 | Holmboe et al. |
| 7,790,093 B2 | 9/2010 | Shkolnik et al. |
| 7,795,349 B2 | 9/2010 | Bredt et al. |
| 7,815,826 B2 | 10/2010 | Serdy et al. |
| 7,867,302 B2 | 1/2011 | Nevoret et al. |
| 7,892,474 B2 | 2/2011 | Shkolnik et al. |
| 7,894,921 B2 | 2/2011 | John et al. |
| 7,896,639 B2 | 3/2011 | Kritchman et al. |
| 7,946,840 B2 | 5/2011 | Perret et al. |
| 7,959,847 B2 | 6/2011 | Wicker et al. |
| 8,003,040 B2 | 8/2011 | El-Siblani |
| 8,071,055 B2 | 9/2011 | Davidson et al. |
| 8,110,135 B2 | 2/2012 | El-Siblani |
| 8,126,580 B2 | 2/2012 | El-Siblani et al. |
| 8,157,908 B2 | 4/2012 | Williams |
| 8,185,229 B2 | 5/2012 | Davidson |
| 8,096,262 B2 | 6/2012 | Ederer et al. |
| 8,211,226 B2 | 7/2012 | Bredt et al. |
| 8,318,452 B2 | 11/2012 | Rambach |
| 8,326,024 B2 | 12/2012 | Shkolnik et al. |
| 8,394,313 B2 | 3/2013 | El-Siblani et al. |
| 8,444,903 B2 | 5/2013 | Lyons et al. |
| 8,475,946 B1 | 7/2013 | Dion et al. |
| 8,506,862 B2 | 8/2013 | Giller et al. |
| 8,506,870 B2 | 8/2013 | Hochsmann et al. |
| 8,568,649 B1 | 10/2013 | Balistreri et al. |
| 8,616,872 B2 | 12/2013 | Matsui et al. |
| 8,623,264 B2 | 1/2014 | Rohner et al. |
| 8,636,494 B2 | 1/2014 | Gothait et al. |
| 8,636,496 B2 | 1/2014 | Das et al. |
| 8,666,142 B2 | 3/2014 | Shkolnik et al. |
| 8,715,832 B2 | 5/2014 | Ederer et al. |
| 8,741,194 B1 | 6/2014 | Ederer et al. |
| 8,741,203 B2 | 6/2014 | Liska et al. |
| 8,761,918 B2 | 6/2014 | Silverbrook |
| 8,801,418 B2 | 8/2014 | El-Siblani et al. |
| 8,815,141 B2 | 8/2014 | Swanson et al. |
| 8,815,143 B2 | 8/2014 | John et al. |
| 8,844,133 B2 | 8/2014 | Fuller |
| 8,845,316 B2 | 9/2014 | Schillen et al. |
| 8,845,953 B1 | 9/2014 | Balistreri et al. |
| 8,845,983 B2 | 9/2014 | Balistreri et al. |
| 8,876,513 B2 | 11/2014 | Lim et al. |
| 8,915,728 B2 | 12/2014 | Mironets et al. |

(56) References Cited

U.S. PATENT DOCUMENTS

| | | |
|---|---|---|
| 8,926,304 B1 | 1/2015 | Chen |
| 8,926,879 B2 | 1/2015 | Vagt et al. |
| 8,932,511 B2 | 1/2015 | Napadensky |
| 8,968,625 B2 | 3/2015 | Tan |
| 8,974,213 B1 | 3/2015 | Yakubov et al. |
| 8,991,211 B1 | 3/2015 | Arlotti et al. |
| 8,998,601 B2 | 4/2015 | Busato |
| 9,011,136 B1 | 4/2015 | Uzan et al. |
| 9,067,359 B2 | 6/2015 | Rohner et al. |
| 9,073,260 B2 | 7/2015 | El-Siblani et al. |
| 9,073,261 B2 | 7/2015 | El-Siblani et al. |
| 9,073,262 B2 | 7/2015 | El-Siblani et al. |
| 9,075,409 B2 | 7/2015 | El-Siblani et al. |
| 9,079,355 B2 | 7/2015 | El-Siblani et al. |
| 9,079,357 B2 | 7/2015 | Ebert et al. |
| 9,101,321 B1 | 8/2015 | Kiesser |
| 9,120,270 B2 | 9/2015 | Chen et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,162,391 B2 | 10/2015 | Yakubov et al. |
| 9,186,846 B1 | 11/2015 | Mark et al. |
| 9,186,848 B2 | 11/2015 | Mark et al. |
| 9,205,601 B2 | 12/2015 | DeSimone et al. |
| 9,211,678 B2 | 12/2015 | DeSimone et al. |
| 9,216,543 B1 | 12/2015 | Listsin et al. |
| 9,216,546 B2 | 12/2015 | DeSimone et al. |
| 9,233,504 B2 | 1/2016 | Douglas et al. |
| 9,248,600 B2 | 2/2016 | Goodman et al. |
| 9,259,880 B2 | 2/2016 | Chen |
| 9,327,385 B2 | 5/2016 | Webb et al. |
| 9,327,452 B2 | 5/2016 | Mark et al. |
| 9,327,453 B2 | 5/2016 | Mark et al. |
| 9,360,757 B2 | 6/2016 | DeSimone et al. |
| 9,364,848 B2 | 6/2016 | Silverbrook |
| 9,370,896 B2 | 6/2016 | Mark |
| 9,403,322 B2 | 8/2016 | Das et al. |
| 9,403,324 B2 | 8/2016 | Ederer et al. |
| 9,415,544 B2 | 8/2016 | Kerekes et al. |
| 9,429,104 B2 | 8/2016 | Fuller |
| 9,434,107 B2 | 9/2016 | Zenere |
| 9,453,142 B2 | 9/2016 | Rolland et al. |
| 9,456,884 B2 | 10/2016 | Ucelmann et al. |
| 9,463,488 B2 | 10/2016 | Ederer et al. |
| 9,469,074 B2 | 10/2016 | Ederer et al. |
| 9,487,443 B2 | 11/2016 | Watanabe |
| 9,498,920 B2 | 11/2016 | DeSimone et al. |
| 9,511,546 B2 | 12/2016 | Chen et al. |
| 9,517,591 B2 | 12/2016 | Yoo et al. |
| 9,517,592 B2 | 12/2016 | Yoo et al. |
| 9,527,243 B2 | 12/2016 | Yakubov et al. |
| 9,527,244 B2 | 12/2016 | El-Siblani |
| 9,529,371 B2 | 12/2016 | Nakamura |
| 9,533,450 B2 | 1/2017 | El-Siblani et al. |
| 9,539,762 B2 | 1/2017 | Durand et al. |
| 9,545,753 B2 | 1/2017 | Costabeber |
| 9,555,584 B2 | 1/2017 | Costabeber |
| 9,561,622 B2 | 2/2017 | Das et al. |
| 9,561,623 B2 | 2/2017 | El-Siblani et al. |
| 9,578,695 B2 | 2/2017 | Jerby et al. |
| 9,579,851 B2 | 2/2017 | Mark et al. |
| 9,579,852 B2 | 2/2017 | Okamoto |
| 9,592,635 B2 | 3/2017 | Ebert et al. |
| 9,604,411 B2 | 3/2017 | Rogren |
| 9,610,616 B2 | 4/2017 | Chen et al. |
| 9,623,607 B2 | 4/2017 | Uzan et al. |
| 9,632,420 B2 | 4/2017 | Allanic |
| 9,632,983 B2 | 4/2017 | Ueda et al. |
| 9,636,873 B2 | 5/2017 | Joyce |
| 9,649,812 B2 | 5/2017 | Hartmann et al. |
| 9,649,815 B2 | 5/2017 | Atwood et al. |
| 9,670,371 B2 | 6/2017 | Pervan et al. |
| 9,676,143 B2 | 6/2017 | Kashani-Shirazi |
| 9,676,963 B2 | 6/2017 | Rolland et al. |
| 9,682,166 B2 | 6/2017 | Watanabe |
| 9,682,425 B2 | 6/2017 | Xu et al. |
| 9,688,028 B2 | 6/2017 | Mark et al. |
| 9,694,544 B2 | 7/2017 | Mark et al. |
| 10,155,882 B2 | 12/2018 | Rolland et al. |
| 10,220,409 B2 | 3/2019 | Miller |
| 10,240,066 B2 | 3/2019 | Rolland et al. |
| 11,491,724 B2 * | 11/2022 | Hutchinson ............. B22F 10/40 |
| 2004/0060683 A1 | 4/2004 | Sercombe et al. |
| 2007/0075460 A1 | 4/2007 | Wahlstrom et al. |
| 2008/0170112 A1 | 7/2008 | Hull et al. |
| 2009/0304952 A1 | 12/2009 | Kritchman |
| 2010/0003619 A1 | 1/2010 | Das et al. |
| 2010/0283188 A1 | 11/2010 | Rohner et al. |
| 2011/0309554 A1 | 12/2011 | Liska et al. |
| 2011/0310370 A1 | 12/2011 | Rohner et al. |
| 2012/0195994 A1 | 8/2012 | El-Siblani et al. |
| 2012/0248657 A1 | 10/2012 | Ebert et al. |
| 2014/0084517 A1 | 3/2014 | Sperry et al. |
| 2014/0103581 A1 | 4/2014 | Das et al. |
| 2014/0275317 A1 | 9/2014 | Moussa |
| 2014/0319735 A1 | 10/2014 | El-Siblani et al. |
| 2014/0322374 A1 | 10/2014 | El-Siblani et al. |
| 2014/0328963 A1 | 11/2014 | Mark et al. |
| 2014/0328964 A1 | 11/2014 | Mark et al. |
| 2014/0361460 A1 | 12/2014 | Mark |
| 2015/0102531 A1 | 4/2015 | El-Siblani et al. |
| 2015/0108677 A1 | 4/2015 | Mark et al. |
| 2015/0140152 A1 | 5/2015 | Chen |
| 2015/0145174 A1 | 5/2015 | Comb |
| 2015/0165691 A1 | 6/2015 | Mark et al. |
| 2015/0165695 A1 | 6/2015 | Chen et al. |
| 2015/0183168 A1 | 7/2015 | Liverman et al. |
| 2015/0210007 A1 | 7/2015 | Durand et al. |
| 2015/0210012 A1 | 7/2015 | Zenere |
| 2015/0217516 A1 | 8/2015 | Yakubov et al. |
| 2015/0224710 A1 | 8/2015 | El-Siblani |
| 2015/0231827 A1 | 8/2015 | Uzan et al. |
| 2015/0231831 A1 | 8/2015 | El-Siblani |
| 2015/0246487 A1 | 9/2015 | El-Siblani |
| 2015/0266243 A1 | 9/2015 | Mark et al. |
| 2015/0273762 A1 | 10/2015 | Okamoto |
| 2015/0290875 A1 | 10/2015 | Mark et al. |
| 2015/0314531 A1 | 11/2015 | Mark et al. |
| 2015/0314534 A1 | 11/2015 | Yakubov et al. |
| 2015/0343705 A1 | 12/2015 | Chen et al. |
| 2015/0352782 A1 | 12/2015 | Listitsin et al. |
| 2015/0355553 A1 | 12/2015 | Allanic |
| 2015/0375457 A1 | 12/2015 | Mark et al. |
| 2016/0009030 A1 | 1/2016 | Mark et al. |
| 2016/0031010 A1 | 2/2016 | O'Neill et al. |
| 2016/0046075 A1 | 2/2016 | DeSimone et al. |
| 2016/0059485 A1 | 3/2016 | Ding et al. |
| 2016/0066187 A1 | 3/2016 | Wynn et al. |
| 2016/0067928 A1 | 3/2016 | Mark |
| 2016/0096324 A1 | 4/2016 | Giller |
| 2016/0096332 A1 | 4/2016 | Chen et al. |
| 2016/0107379 A1 | 4/2016 | Mark et al. |
| 2016/0107387 A1 | 4/2016 | Ooba et al. |
| 2016/0129631 A1 | 5/2016 | Chen et al. |
| 2016/0129643 A1 | 5/2016 | Mark et al. |
| 2016/0144565 A1 | 5/2016 | Mark et al. |
| 2016/0144566 A1 | 5/2016 | Mark et al. |
| 2016/0152860 A1 | 6/2016 | Lisitsin et al. |
| 2016/0166359 A1 | 6/2016 | Flach et al. |
| 2016/0192741 A1 | 7/2016 | Mark |
| 2016/0193785 A1 | 7/2016 | Bell et al. |
| 2016/0200047 A1 | 7/2016 | Mark et al. |
| 2016/0214327 A1 | 7/2016 | Uckelmann et al. |
| 2016/0221262 A1 | 8/2016 | Das et al. |
| 2016/0250807 A1 | 9/2016 | Atwood |
| 2016/0288413 A1 | 10/2016 | Yakubov et al. |
| 2016/0297141 A1 | 10/2016 | El-Siblani et al. |
| 2016/0311165 A1 | 10/2016 | Mark et al. |
| 2016/0332386 A1 | 11/2016 | Kuijpers |
| 2016/0346998 A1 | 12/2016 | Mark et al. |
| 2016/0361869 A1 | 12/2016 | Mark et al. |
| 2016/0361872 A1 | 12/2016 | El-Siblani |
| 2016/0368213 A1 | 12/2016 | Mark |

(56) References Cited

U.S. PATENT DOCUMENTS

| | | |
|---|---|---|
| 2016/0368512 A1 | 12/2016 | Mark |
| 2017/0001377 A1 | 1/2017 | Meisner et al. |
| 2017/0008234 A1 | 1/2017 | Cullen et al. |
| 2017/0008236 A1 | 1/2017 | Easter et al. |
| 2017/0015059 A1 | 1/2017 | Lewicki |
| 2017/0015060 A1 | 1/2017 | Lewicki et al. |
| 2017/0049583 A1 | 2/2017 | Belter et al. |
| 2017/0056966 A1 | 3/2017 | Myerberg et al. |
| 2017/0056967 A1 | 3/2017 | Fulop et al. |
| 2017/0056970 A1 | 3/2017 | Chin et al. |
| 2017/0057166 A1 | 3/2017 | Soria et al. |
| 2017/0057177 A1 | 3/2017 | Ferguson et al. |
| 2017/0057178 A1 | 3/2017 | FrantzDale et al. |
| 2017/0066196 A1 | 3/2017 | Beard et al. |
| 2017/0072635 A1 | 3/2017 | El-Siblani et al. |
| 2017/0087632 A1 | 3/2017 | Mark |
| 2017/0100891 A1 | 4/2017 | Meisner et al. |
| 2017/0100893 A1 | 4/2017 | Meisner et al. |
| 2017/0100895 A1 | 4/2017 | Chou et al. |
| 2017/0100897 A1 | 4/2017 | Chou et al. |
| 2017/0100899 A1 | 4/2017 | El-Siblani et al. |
| 2017/0102679 A1 | 4/2017 | Greene et al. |
| 2017/0113409 A1 | 4/2017 | Patrov |
| 2017/0120332 A1 | 5/2017 | DeMuth et al. |
| 2017/0120333 A1 | 5/2017 | DeMuth et al. |
| 2017/0120334 A1 | 5/2017 | DeMuth et al. |
| 2017/0120335 A1 | 5/2017 | DeMuth et al. |
| 2017/0120336 A1 | 5/2017 | DeMuth et al. |
| 2017/0120387 A1 | 5/2017 | DeMuth et al. |
| 2017/0120518 A1 | 5/2017 | DeMuth et al. |
| 2017/0120519 A1 | 5/2017 | Mark |
| 2017/0120529 A1 | 5/2017 | DeMuth et al. |
| 2017/0120530 A1 | 5/2017 | DeMuth et al. |
| 2017/0120536 A1 | 5/2017 | Brunermer et al. |
| 2017/0120537 A1 | 5/2017 | DeMuth et al. |
| 2017/0120538 A1 | 5/2017 | DeMuth et al. |
| 2017/0123222 A1 | 5/2017 | DeMuth et al. |
| 2017/0123237 A1 | 5/2017 | DeMuth et al. |
| 2017/0136688 A1 | 5/2017 | Knecht et al. |
| 2017/0136708 A1 | 5/2017 | Das et al. |
| 2017/0157848 A1 | 6/2017 | Teicher et al. |
| 2017/0165916 A1 | 6/2017 | El-Siblani |
| 2017/0173692 A1 | 6/2017 | Myerberg et al. |
| 2017/0173693 A1 | 6/2017 | Myerberg et al. |
| 2017/0173694 A1 | 6/2017 | Myerberg et al. |
| 2017/0173695 A1 | 6/2017 | Myerberg et al. |
| 2017/0173697 A1 | 6/2017 | Myerberg et al. |
| 2017/0173865 A1 | 6/2017 | Dikovsky et al. |
| 2017/0173868 A1 | 6/2017 | Mark |
| 2017/0173877 A1 | 6/2017 | Myerberg et al. |
| 2017/0173878 A1 | 6/2017 | Myerberg et al. |
| 2017/0173879 A1 | 6/2017 | Myerberg et al. |
| 2017/0182560 A1 | 6/2017 | Myerberg et al. |
| 2017/0182708 A1 | 6/2017 | Lin et al. |
| 2017/0190120 A1 | 7/2017 | Bloome et al. |
| 2017/0197363 A1 | 7/2017 | FrantzDale |
| 2017/0232674 A1 | 8/2017 | Mark |
| 2017/0252808 A1 | 9/2017 | Myerberg et al. |
| 2017/0252809 A1 | 9/2017 | Myerberg et al. |
| 2017/0252810 A1 | 9/2017 | Myerberg et al. |
| 2017/0252811 A1 | 9/2017 | Myerberg et al. |
| 2017/0252812 A1 | 9/2017 | Mykulowycz et al. |
| 2017/0252813 A1 | 9/2017 | Myerberg et al. |
| 2017/0252814 A1 | 9/2017 | Myerberg et al. |
| 2017/0252815 A1 | 9/2017 | Fontana et al. |
| 2017/0252816 A1 | 9/2017 | Shim et al. |
| 2017/0252817 A1 | 9/2017 | Mykulowycz et al. |
| 2017/0252818 A1 | 9/2017 | Gibson et al. |
| 2017/0252819 A1 | 9/2017 | Gibson et al. |
| 2017/0252820 A1 | 9/2017 | Myerberg et al. |
| 2017/0252821 A1 | 9/2017 | Sachs et al. |
| 2017/0252822 A1 | 9/2017 | Sachs et al. |
| 2017/0252823 A1 | 9/2017 | Sachs et al. |
| 2017/0252824 A1 | 9/2017 | Gibson et al. |
| 2017/0252825 A1 | 9/2017 | Fontana et al. |
| 2017/0252826 A1 | 9/2017 | Sachs et al. |
| 2017/0252827 A1 | 9/2017 | Sachs et al. |
| 2017/0252828 A1 | 9/2017 | Sachs et al. |
| 2017/0252829 A1 | 9/2017 | Sachs |
| 2017/0252830 A1 | 9/2017 | Sachs et al. |
| 2017/0252851 A1 | 9/2017 | Fulop et al. |
| 2017/0266876 A1 | 9/2017 | Hocker |
| 2017/0266880 A1 | 9/2017 | Matsubara |
| 2017/0266890 A1 | 9/2017 | Volk |
| 2017/0297097 A1 | 9/2017 | Gibson et al. |
| 2017/0297098 A1 | 9/2017 | Myerberg et al. |
| 2017/0297099 A1 | 9/2017 | Gibson et al. |
| 2017/0297100 A1 | 9/2017 | Gibson et al. |
| 2017/0297102 A1 | 10/2017 | Chin et al. |
| 2017/0297103 A1 | 10/2017 | Myerberg et al. |
| 2017/0297104 A1 | 10/2017 | Gibson et al. |
| 2017/0297106 A1 | 10/2017 | Myerberg et al. |
| 2017/0297108 A1 | 10/2017 | Gibson et al. |
| 2017/0297109 A1 | 10/2017 | Gibson et al. |
| 2017/0297111 A1 | 10/2017 | Myerberg et al. |
| 2017/0297275 A1 | 10/2017 | Mark et al. |
| 2017/0369731 A1 | 12/2017 | Lisitsin et al. |
| 2018/0200948 A1 | 7/2018 | Kuijpers et al. |
| 2018/0272608 A1 | 9/2018 | Yun |
| 2018/0311900 A1 | 11/2018 | McMahon et al. |
| 2019/0016046 A1 | 1/2019 | Liu |
| 2019/0126533 A1 | 5/2019 | Thompson |
| 2019/0126535 A1 | 5/2019 | Thompson |
| 2019/0126536 A1 | 5/2019 | Thompson |
| 2019/0126548 A1 | 5/2019 | Barnhart et al. |
| 2019/0143601 A1 | 5/2019 | Jung et al. |
| 2019/0232560 A1 | 8/2019 | Thompson |
| 2019/0322038 A1 | 10/2019 | Thompson |
| 2020/0282645 A1 | 9/2020 | Vermuelen et al. |
| 2021/0060651 A1 | 3/2021 | Go et al. |
| 2022/0134657 A1 | 5/2022 | Schmidt et al. |

FOREIGN PATENT DOCUMENTS

| | | |
|---|---|---|
| EP | 3012079 | 4/2016 |
| EP | 3094478 A1 | 11/2016 |
| FR | 3059920 A1 | 6/2018 |
| JP | S61114817 A | 6/1986 |
| JP | S61114818 A | 6/1986 |
| JP | S61116322 A | 6/1986 |
| JP | H0499203 A | 3/1992 |
| JP | 5237942 B2 | 7/2013 |
| NL | 2012087 C2 | 7/2015 |
| NL | 2015169 B1 | 2/2017 |
| WO | WO9806560 A1 | 2/1998 |
| WO | WO2006/077665 A1 | 7/2006 |
| WO | WO2008/118263 | 10/2008 |
| WO | WO2009/136861 A1 | 11/2009 |
| WO | WO2010/045950 A1 | 4/2010 |
| WO | WO2012/106256 A1 | 8/2012 |
| WO | WO2015/107066 A1 | 7/2015 |
| WO | WO2016/112084 A1 | 7/2016 |
| WO | WO2016/125138 | 8/2016 |
| WO | WO2016/153106 A1 | 9/2016 |
| WO | WO2017/009368 A1 | 1/2017 |
| WO | WO2017/043747 A1 | 3/2017 |
| WO | WO2017/091913 A1 | 6/2017 |
| WO | WO2019063242 A1 | 4/2019 |
| WO | WO2021028333 A1 | 2/2021 |

OTHER PUBLICATIONS

Amazon, ForLife Capsule Infuser. (Website Only) https://www.amazon.com/FORLIFE-592-SLS-Capsule-Infuser/dp/B00MVA1DSA/ref=pd_sim_79_1?_encoding=UTF8&pd_rd_i=B00MVA1DSA&pd_rd_r=4AQA3MA3HJH50EHYNYR5&pd_rd_w=i0cBj&pd_rd_wg=9SVMi&psc=1&refRID=4AQA3MA3HJH50EHYNYR5.

Amazon, House Again, House Again Tea Ball Infuser & Cooking Infuser, Extra Fine Mesh Tea Infuser Threaded Connection for Single Cup. (Website Only) https:/www.amazon.com/Infuser-Threaded-Connection-Stainless-Extended/dp/B075K57B73/ref=pd_sim_79_1?_encoding=UTF8&pd_rd_i=B075K57B73&pd_rd_r=

(56) References Cited

OTHER PUBLICATIONS

YC4NPWJTTS9HF2YTK6ST&pd_rd_w=wOOOX&pd_rd_wg=oe9CX&psc=1&refRID=YC4NPWJTTS9HF2YTK6ST.

Amazon, Live Infused, Large Capacity Stainless Steel Tea Infuser by Live Infused—Silicone Covers Handles & Lid Prevent Burns, Spills. (Website Only) https://www.amazon.com/dp/B01IGSHS34/ref=sspa_dk_detail_3?psc=1&pd_rd_i=B01IGSHS34&pd_rd_wg=9SVMi&pd_rd_r=4AQA3MA3HJH50EHYNYR5&pd_rd_w=sHM2Q.

Amazon, XMIFER, 300 Micron Mesh Stainless Steel Dry Hopper Brewing Filter for Cornelius Kegs Corny Keg Home Brewing (Website Only) https://www.amazon.com/dp/B078R8Q84D/ref-sspa_dk_detail_2?psc-1&pd_rd_i=B078R8Q84D&pd_rd_wg=oe9CX&pd_rd_=YC4NPWJTTS9HF2YTK6ST&pd_rd_w=DbAbt.

Amazon, Y&M Planter Pots Indoor, 6 inch Modern Plans and Planters Garden White Ceramic Round Bowl with Metal Stand for Succulent Planter Cactus (White & Gold). (Website Only) https://www.amazon.com/MyM-Planter-Indoor-Ceramic-Succulent/dp/B076MVKHF1/ref=sr_1_19?s=lawn-garden&ie=UTF8&qid=1523453690&sr=1-19&keywords=flower+pot+stand.

Amazon, Yoassi, Yoassi 2 Pack 18/8 Stainless Steel Tea Infuser Mesh Strainer with Large Capacity & Perfect Size Double Handles for Hanging on Teapots, Mugs, Cups to steep Loose Leaf Tea and Coffee. (Website Only) https://www.amazon.com/dp/B078G9W16Q/ref=sspa_dk_detail_3?psc=1&pd_rd_i=B078G9W16Q&pd_rd_wg=L6Uxo&pd_rd_r=Y5HK8BYCSNE40Q73FHQ3&pd_rd_w=VpFTw.

Carbon, Carbon SpeedCell™: Additive Manufacturing Reinvented, SpeedCell Changes How Products Designed, Engineered, Made and Delivered with the Introduction of the M2 Printer and Smart Part Washer, 2017, https://www.carbon3d.com/news/carbon-speedcell-additive-manufacturing-reinvented/.

Cole-Parmer, Chemical Compatibility Database (Website Only) https://www.coleparmer.com/Chemical-Resistance.

FormLabs, Form Wash & Form Cure (Website Only) https://formlabs.com/tools/wash-cure/.

Grainger, Drip Pans and Spill Containment Trays. (Website Only) https://www.grainger.com/category/drip-pans-and-spill-containment-trays/spill-control-supplies/safety/ecatalog/N-k4s?searchSortKey=priceAsc.

Grainger, Funnel King, Plastic Drain Pan, 2 gal, Capacity. (Website Only) https://www.grainger.com/product/FUNNEL-KING-Drain-Pan-4CUR2.

Ikea (Website Only) https://www.ikea.com/us/en/catalog/products/S39896371/.

Ikea, Ivar Pine Chair. (Website Only) https://www.ikea.com/us/en/catalog/products/90263902/.

Ikea, Askholmen. (Website Only) https://www.ikea.com/us/en/catalog/products/10258669/.

KUDO3D, Post-Process Your SLA Prints in 4 Easy Steps, 7 Pages. https://www.kudo3d.com/post-process-your-sla-prints-in-4-easy-steps/.

Lee et al., Large-Area Compatible Laser Sintering Schemes with a Spatially Extended Focused Beam, Micromachines, Article 11, Seoul University—Seoul Korea, May 2017, 8 Pages. www.mdpi.com/journal/micromachines.

Lithoz. (Website Only) http://www.lithoz.com/en/our-products/cleaning-station.

Marine Depot, EcoTech Marine Vectra M1 Aquarium DC Water Pump, 6 Pages https://www.marinedepot.com/EcoTech_Marine_Vectra_M1_Aquarium_DC_Water_Pump_Over_1000_Gallons_Per_Hour_Submersible_Aquarium_Pumps-EcoTech_Marine-EM1240-FTWPSBTO-vi.html.

Marine Depot, Ecotech Marine Vectra S1 Aquarium DC Water Pump, Item EEM18742. (Web Page Only) https://www.marinedepot.com/EcoTech_Marine_Vectra_S1_Aquarium_DC_Water_Pump_Over_1000_Gallons_Per_Hour_Submersible_Aquarium_Pumps-EcoTech_Marine-EM18742-FTWPSBTO-vi.html.

Marine Depot, Reef Octopus VarioS-2 Controllable Circulation Pump, 4 Pages https://www.marinedepot.com/Reef_Octopus_VarioS_2_Controllable_DC_Circulation_Pump_Up_to_1000_Gallons_Per_Hour_External_Aquarium_Pumps-Reef_Octopus-CV25218-FTWPEPZT-vi.html.

Matthews et al., Diode-Based Additive Manufacturing of Metals Using an Optically-Addressable Light Valve, Optic Express Research Article, Lawrence Livermore National Laboratory, vol. 25, No. 10, Livermore, California, May 10, 2017.

Micron3D, Cleaning of Printed Models, Dec. 5, 2016 (YouTube Video) https://www.youtube.com/watch?v=soA1rSs1iBY.

Moritz et al., 4-Additive Manufacturing of Ceramic Components, Additive Manufacturing, Stereolithography, Science Direct, 2018, pp. 131-132. (Abstract Only) https://www.sciencedirect.com/science/article/pii/B9780128121559000049.

Morton, Facilities, University of Calgary. (Website Only) http://www.ucalgary.ca/cmorton/facilities.

Nussbaum et al., Evaluation of Processing Variables in Large Area Polymer Sintering of Single Layer Components, Solid Freeform Fabrication 2016: Proceedings of the 27th Annual International Solid Freeform Fabrication Symposium—An Additive Manufacturing Conference Reviewed Pater, University of Florida, Tampa, Florida, 15 Pages.

Ramco—Ram Tough—Fully Automated Wash/Rinse/Dry System, Jul. 9, 2013. (YouTube Video) https://www.youtube.com/watch?v=i8S5Oc3FVFU.

Ramkleen, Ramco Parts Washers (Website Only) https://ramkleen.com.

Ultrasonic Cleaning of 3D Printer Parts, Feb. 26, 2014 (Website Only) https://www.youtube.com/watch?v=Gxi47OS5ohk.

\* cited by examiner

CLEANING SYSTEM FOR ADDITIVE MANUFACTURING

CROSS-REFERENCE TO RELATED APPLICATION

The present application claims priority to U.S. Provisional Patent Application Ser. No. 63/231,966, filed on Aug. 11, 2021, the contents of which of which are hereby incorporated by reference in their entirety.

FIELD

The present subject matter relates generally to cleaning systems for additively manufactured components.

BACKGROUND

Additive manufacturing is a process in which material is built up layer-by-layer from a build material, such as organic or inorganic powders, binders, and/or resins to form a component. Once the component is formed, the build material may be retained on the component and/or within various features of the component due to the layer-by-layer formation of the component. Accordingly, it may be beneficial to create a cleaning system that is configured to remove the residual build material from the component.

BRIEF DESCRIPTION

Aspects and advantages of the present disclosure will be set forth in part in the following description, or may be obvious from the description, or may be learned through practice of the present disclosure.

In some embodiments of the present disclosure, a cleaning system for an additively manufactured component is provided. The cleaning system includes a tank configured to store a cleaning liquid. A fluid circuit is operably coupled with the tank. A pump is coupled with the fluid circuit. A manifold is configured to receive fluid from the fluid circuit through the pump. The cleaning system further includes at least one of a coupler defined by the manifold or a hose coupled with the manifold. The at least one of the coupler defined by the manifold or the hose is configured to couple with said additively manufactured component.

In some embodiments of the present disclosure, a method of cleaning an additive manufacturing component. The method includes coupling an additively manufactured component to an adaptor. The method also includes fluidly coupling a manifold to the adaptor. In addition, the method includes lowering a support panel into a tank, the tank having a cleaning liquid therein. The method further includes vibrating the cleaning liquid with the additively manufactured component at least partially in the cleaning liquid. Lastly, the method includes raising the support panel above the cleaning liquid.

In some embodiments of the present disclosure, an adaptor for a cleaning system for additively manufactured components is provided. The adaptor includes a first portion defining an adaptor inlet, an adaptor outlet, one or more channels extending between the adaptor inlet and the adaptor outlet, and an adjustment assembly void. A second portion is separated from the first portion through an adjustment assembly. An energy device is operably coupled with the adjustment assembly and configured to urge the second portion towards the first portion.

These and other features, aspects, and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1:
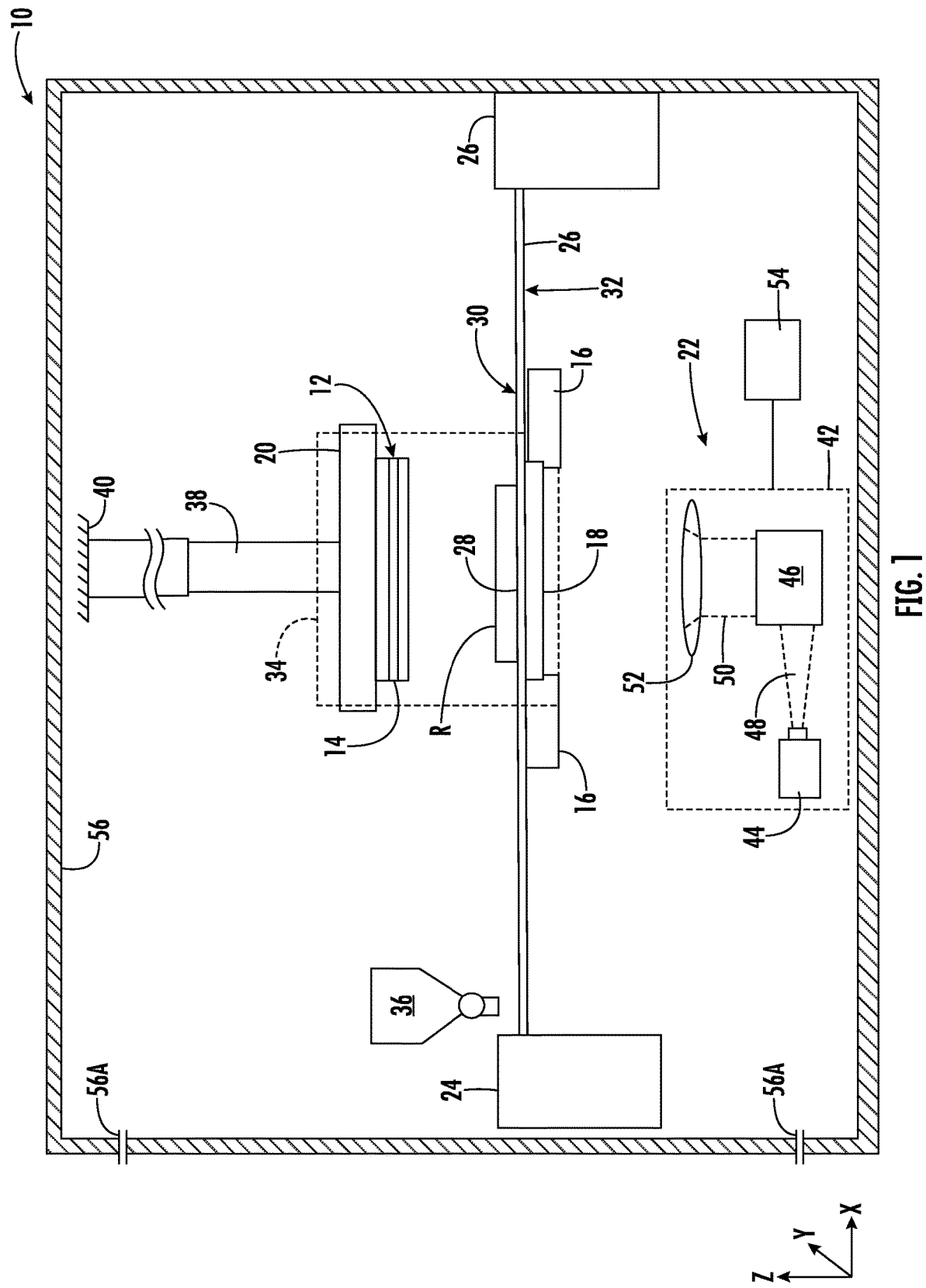
FIG. 1 is a schematic side view of an additive manufacturing apparatus in accordance with various aspects of the present disclosure.

Repeat use of reference characters in the present specification and drawings is intended to represent the same or analogous features or elements of the present disclosure.

DETAILED DESCRIPTION

Reference will now be made in detail to present embodiments of the present disclosure, one or more examples of which are illustrated in the accompanying drawings. The detailed description uses numerical and letter designations to refer to features in the drawings. Like or similar designations in the drawings and description have been used to refer to like or similar parts of the present disclosure.

As used herein, the terms "first," "second," and "third" may be used interchangeably to distinguish one component from another and are not intended to signify a location or importance of the individual components. Moreover, for purposes of convenience and clarity only, directional terms, such as top, bottom, left, right, up, down, over, above, below, beneath, rear, back, and front, may be used with respect to the accompanying drawings. These and similar directional terms should not be construed to limit the scope of the disclosure in any manner. Thus, it will be appreciated that the apparatus and/or any component described here may be oriented in one or more orientations that are rotationally offset from those illustrated without departing from the scope of the present disclosure.

The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to fluid movement through the cleaning system. For example, "upstream" refers to the direction from which the fluid moves and "downstream" refers to the direction to which the fluid moves. The term "selectively" refers to a component's ability to operate in various states (e.g., an ON state and an OFF state) based on manual and/or automatic control of the component.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein will be considered exemplary.

Here and throughout the specification and claims, range limitations are combined, and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

The present disclosure is generally directed to a cleaning system for an additively manufactured component or any other manufactured component. The additively manufactured component may be formed such that successive layers of materials are provided on each other to "build-up," layer-by-layer, a three-dimensional component. The successive layers generally consolidate together to form a monolithic component which may have a variety of integral sub-components. Due to the component being formed in a layer-by-layer fashion, residual, unconsolidated or partially unconsolidated build material may be retained within the component and/or on the component.

In some instances, component accuracy or quality may be enhanced through removal of the residual, unconsolidated build material from the component through one or more cleaning processes that individually or in combination remove at least a portion of the residual build material from the component. The various cleaning processes may be implemented in any order for any duration of time based on the component to be cleaned. In some examples, the order of the cleaning processes may be predefined and/or operator selected. In addition, the duration of each process and/or the order of processes may be altered through a Human-Machine Interface (HMI) and/or through any other practicable device.

In several embodiments, one of the various cleaning processes can include flushing a cleaning fluid, which may be in the form of a cleaning liquid and/or a cleaning gas, along the component and/or within one or more features of the component. As used herein, the features of the component may include a channel, a void, a cavity, and/or any other attribute that may be formed within the component.

Further, one of the various cleaning processes may also include at least partially submerging the component within the cleaning liquid to remove the residual build material. In some examples, the support panel may be movable from a first position to a second position. In the first position, the component may be positioned above the cleaning liquid. In the second position, the component may be at least partially submerged in the cleaning liquid within the tank. By moving between the first and second positions, the cleaning liquid may be provided along the component and/or within one or more features of the component, which is then exhausted from the component with the residual build material when the component is returned to the first position.

Still further, one of the various cleaning processes may also include vibrating (or otherwise agitating) the cleaning fluid with the component at least partially submerged therein to separate the residual build material from the component. For example, a vibration module may be operably coupled with the tank and configured to oscillate the cleaning liquid within the tank. The movement of the cleaning liquid may further encourage the removal of the residual build material from the component.

In several instances, the cleaning system may include an adaptor that operably couples with the component. The adaptor may include one or more channels therethrough that align with one or more features of the component for directing the cleaning fluid towards the predefined features and/or predefined locations.

Referring to the drawings wherein identical reference numerals denote the similar elements throughout the various views, FIG. 1 schematically illustrates an example of one type of suitable apparatus 10 for forming a component layer by layer. The component 12 is created through a stacked arrangement of one or more consolidated layers 14 formed from a build material, such as organic or inorganic powders, binders, and/or resins. The apparatus 10 can include one or more of a support plate 16, a window 18, a stage 20 that is movable relative to the window 18, and a radiant energy device 22, which, in combination, may be used to form any number (e.g., one or more) of additively manufactured components 12.

In the illustrated example, the apparatus 10 includes a feed module 24 and a take-up module 26 that are spaced-apart with a build material support 28, such as a flexible tape, a foil, or another type of build material support, extending therebetween. Suitable mechanical supports (frames, brackets, etc.) may be provided for the feed module 24, the take-up module 26, and the support plate 16. The feed module 24 and/or the take-up module 26 can be configured to control the speed and direction of the build material support 28 such that the desired tension and speed is maintained in the build material support 28 through a drive system. By way of example and not limitation, the drive system can include various components, such as motors, actuators, feedback sensors, and/or controls to maintain the build material support 28 tensioned between the feed module 24 and the take-up module 26 and to translate the build material support 28 along a path from the feed module 24 to the take-up module 26.

In various embodiments, the window 18 is transparent and can be operably supported by the support plate 16. Likewise, the build material support 28 is also transparent or includes portions that are transparent. As used herein, the terms "transparent" and "radiotransparent" refer to a material that allows at least a portion of radiant energy of a selected wavelength to pass through. For example, the radiant energy that passes through the window 18 and the build material support 28 can be in the ultraviolet spectrum, the infrared spectrum, the visible spectrum, or any other practicable radiant energy. Non-limiting examples of transparent materials include polymers, glass, and crystalline minerals, such as sapphire or quartz.

The build material support 28 defines a first side 30 that defines a "resin surface," which is shown as being planar, but could alternatively be arcuate. The first side 30 may be positioned to face the stage 20 with the window 18 on an opposing, second side 32 of the build material support 28 from the stage 20. For purposes of convenient description, the first side 30 may be considered to be oriented parallel to an X-Y plane of the apparatus 10, and a direction perpendicular to the X-Y plane is denoted as a Z-axis direction (X, Y, and Z being three mutually perpendicular directions). As used herein, the X-axis refers to the machine direction along the length of the build material support 28. As used herein, the Y-axis refers to the transverse direction across the width of the build material support 28 and generally perpendicular to the machine direction. As used herein, the Z-axis refers to the stage direction that can be defined as the direction of movement of the stage 20 relative to the window 18.

The first side 30 may be configured to be "non-stick," that is, resistant to adhesion of a consolidated build material. The non-stick properties may be embodied by a combination of variables such as the chemistry of the build material support 28, a surface finish of the build material support 28, and/or coatings applied to the build material support 28. For instance, a permanent or semi-permanent non-stick coating may be applied. One non-limiting example of a suitable coating is polytetrafluoroethylene ("PTFE"). In some examples, all or a portion of the first side 30 may incorporate a controlled roughness or surface texture (e.g. protrusions, dimples, grooves, ridges, etc.) with nonstick properties. Additionally, or alternatively, the build material support 28 may be made in whole or in part from an oxygen-permeable material.

For reference purposes, an area or volume immediately surrounding the location of the build material support 28 and the window 18 or transparent portion defined by the support plate 16 may be defined as a "build zone," labeled 34. In some instances, a material depositor 36 may be upstream of the build zone 34. The material depositor 36 may be any device or combination of devices that is operable to apply a build material on the resin support 28. The material depositor 36 may optionally include a device or combination of devices to define a height of the build material on the resin support 28 and/or to level the build material on the build material support 28. Nonlimiting examples of suitable material deposition devices include chutes, hoppers, pumps, spray nozzles, spray bars, or printheads (e.g. inkjets). In some examples, a doctor blade may be used to control the thickness of build material applied to the build material support 28, as the build material support 28 passes the material depositor 36.

The build material includes any material that is capable of adhering or binding together the filler (if used) in the consolidated state. As used herein, the term "radiant-energy curable" refers to any material which solidifies or partially solidifies in response to the application of radiant energy of a frequency and energy level. For example, the build material may include a photopolymer resin containing photoinitiator compounds functioning to trigger a polymerization reaction, causing the build material to change from a liquid (or powdered) state to a solid state. Alternatively, the build material may include a material that contains a solvent that may be evaporated out by the application of radiant energy. The unconsolidated build material may be provided in solid (e.g. granular) or liquid form, including a paste or slurry.

Furthermore, the build material can have a relatively high viscosity fluid that will not "slump" or run off during the build process. The composition of the build material may be selected as desired to suit an application. Mixtures of different compositions may be used. The build material may be selected to have the ability to out-gas or burn off during further processing, such as a sintering process.

The build material may incorporate a filler. The filler may be pre-mixed with the build material, then loaded into the material depositor 36. The filler includes particles, which may be defined as "a small bit of matter." The filler may include any material that is chemically and physically compatible with the selected build material. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit an application. For example, the filler may be metallic, ceramic, polymeric, and/or organic. Other examples of potential fillers include diamond, silicon, and graphite. Mixtures of different compositions may be used. In some examples, the filler composition may be selected for its electrical or electromagnetic properties, e.g. it may specifically be an electrical insulator, a dielectric material, an electrical conductor, and/or magnetic.

The filler may be "fusible," meaning it is capable of consolidation into a mass upon via application of enough energy. For example, fusibility is a characteristic of many available powders including, but not limited to, polymeric, ceramic, glass, and/or metallic materials. The proportion of filler to build material may be selected to suit an application. Generally, any amount of filler may be used so long as the combined material is capable of flowing and being leveled, and there is enough build material to hold together the particles of the filler in the consolidated state.

With further reference to FIG. 1, the stage 20 is capable of being oriented parallel to the first side 30 or the X-Y plane. Various devices may be provided for moving the stage 20 relative to the window 18 parallel to the Z-axis direction. For example, as illustrated in FIG. 1, the movement may be provided through an actuator 38 connected between the stage 20 and a static support 40 and configured to change a relative position of the stage 20 relative to the radiant energy device 22, the support plate 16, the window 18, and/or any other static component of the apparatus 10. The actuator 38 may be configured as a ballscrew electric actuator, linear electric actuator, pneumatic cylinder, hydraulic cylinder, delta drive, or any other practicable device may additionally or alternatively be used for this purpose. In addition to, or as an alternative to, making the stage 20 movable, the build material support 28 could be movable parallel to the Z-axis direction.

The radiant energy device 22 may be configured as any device or combination of devices operable to generate and project radiant energy on the build material in a suitable pattern and with a suitable energy level and other operating characteristics to cure the build material during the build process. For example, as shown in FIG. 1, the radiant energy device 22 may include a projector 42, which may generally refer to any device operable to generate a radiant energy patterned image of suitable energy level and other operating characteristics to cure the build material. As used herein, the term "patterned image" refers to a projection of radiant energy comprising an array of one or more individual pixels. Non-limiting examples of patterned imaged devices include a DLP projector or another digital micromirror device, a two-dimensional array of LEDs, a two-dimensional array of lasers, and/or optically addressed light valves. In the illustrated example, the projector 42 includes a radiant energy source 44 such as a UV lamp, an image forming apparatus 46 operable to receive a source beam 48 from the radiant energy source 44 and generate a patterned image 50 to be projected onto the surface of the build material, and optionally focusing optics 52, such as one or more lenses.

The image forming apparatus 46 may include one or more mirrors, prisms, and/or lenses and is provided with suitable actuators and arranged so that the source beam 48 from the radiant energy source 44 can be transformed into a pixelated image in an X-Y plane coincident with the surface of the build material. In the illustrated example, the image forming apparatus 46 may be a digital micro-mirror device.

The projector 42 may incorporate additional components, such as actuators, mirrors, etc. configured to selectively move the image forming apparatus 46 or other part of the projector 42 with the effect of rastering or shifting the location of the patterned image on the first side 30. Stated another way, the patterned image may be moved away from a nominal or starting location.

In addition to other types of radiant energy devices 22, the radiant energy device 22 may include a "scanned beam apparatus" used herein to refer generally to any device operable to generate a radiant energy beam of suitable energy level and other operating characteristics to cure the build material and to scan the beam over the surface of the build material in a desired pattern. For example, the scanned beam apparatus can include a radiant energy source 44 and a beam steering apparatus. The radiant energy source 44 may include any device operable to generate a beam of suitable power and other operating characteristics to cure the build material. Non-limiting examples of suitable radiant energy sources 44 include lasers or electron beam guns.

The apparatus 10 may be operably coupled with an apparatus computing system 54. The apparatus computing system 54 in FIG. 1 is a generalized representation of the hardware and software that may be implemented to control the operation of the apparatus 10, including some or all of the stage 20, the radiant energy device 22, the actuator 38, and the various parts of the apparatus 10 described herein. The apparatus computing system 54 may be embodied, for example, by software running on one or more processors embodied in one or more devices such as a programmable logic controller ("PLC") or a microcomputer. Such processors may be coupled to process sensors and operating components, for example, through wired or wireless connections. The same processor or processors may be used to retrieve and analyze sensor data, for statistical analysis, for feedback control, and/or feedforward control. Numerous aspects of the apparatus 10 may be subject to closed-loop control.

Optionally, the components of the apparatus 10 may be surrounded by an apparatus housing 56, which may be used to provide a shielding or inert gas (e.g., a "process gas") atmosphere using housing ports 56A. Optionally, pressure within the apparatus housing 56 could be maintained at a desired level greater than or less than atmospheric. Optionally, the apparatus housing 56 could be temperature and/or humidity controlled. Optionally, ventilation of the apparatus housing 56 could be controlled based on factors such as a time interval, temperature, humidity, and/or chemical species concentration. In some embodiments, the apparatus housing 56 can be maintained at a pressure that is different than an atmospheric pressure.

It will be appreciated that the additive manufacturing apparatus 10 described in FIG. 1 is for illustrative purposes. Accordingly, any other additive manufacturing process or subtractive manufacturing process may be used in conjunction with or in lieu of the additive manufacturing apparatus 10 described in FIG. 1 to form the component 12 without departing from the scope of the present disclosure.

Figure 2A:
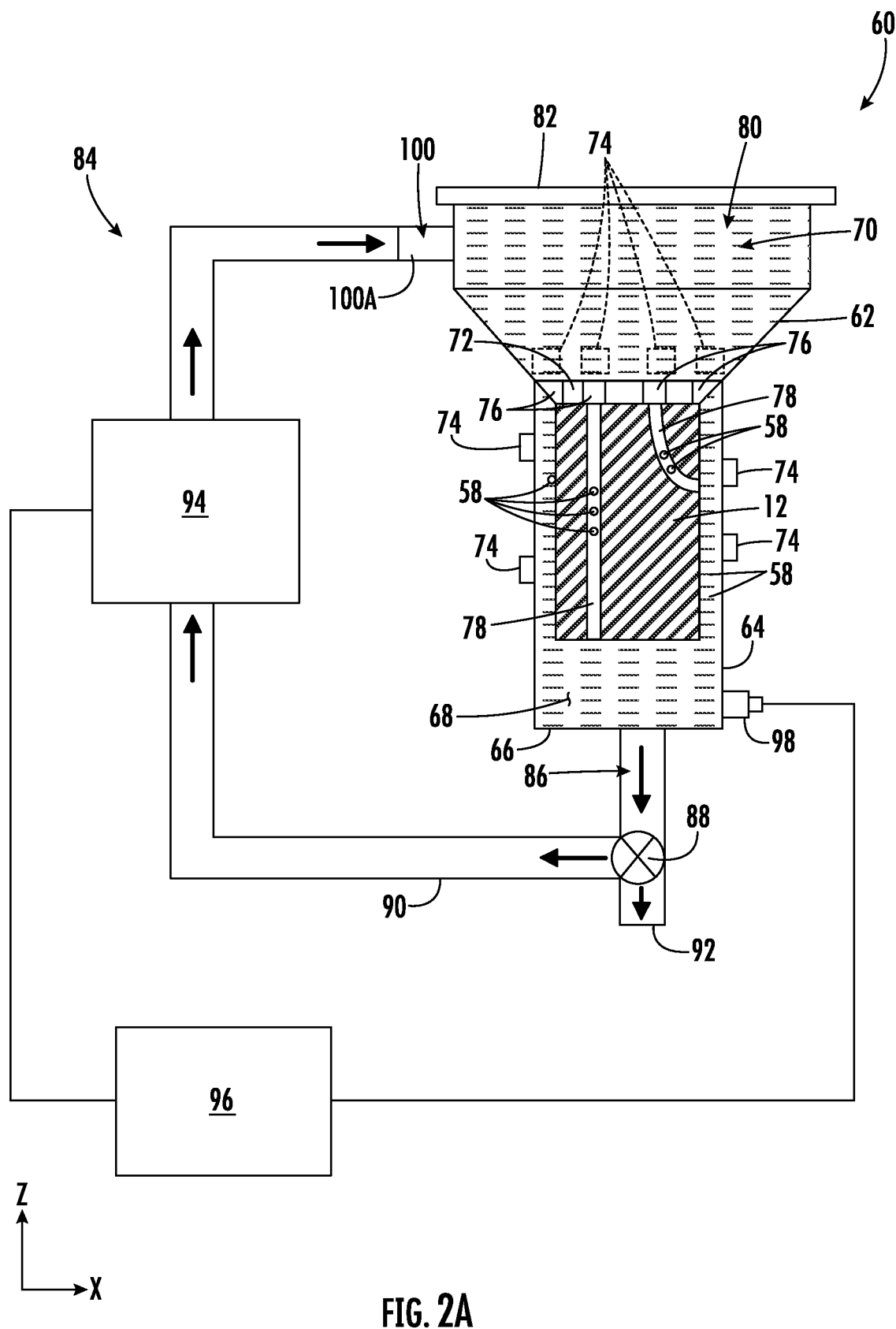
FIG. 2A is a schematic side view of a cleaning system in accordance with various aspects of the present disclosure.
Figure 2B:
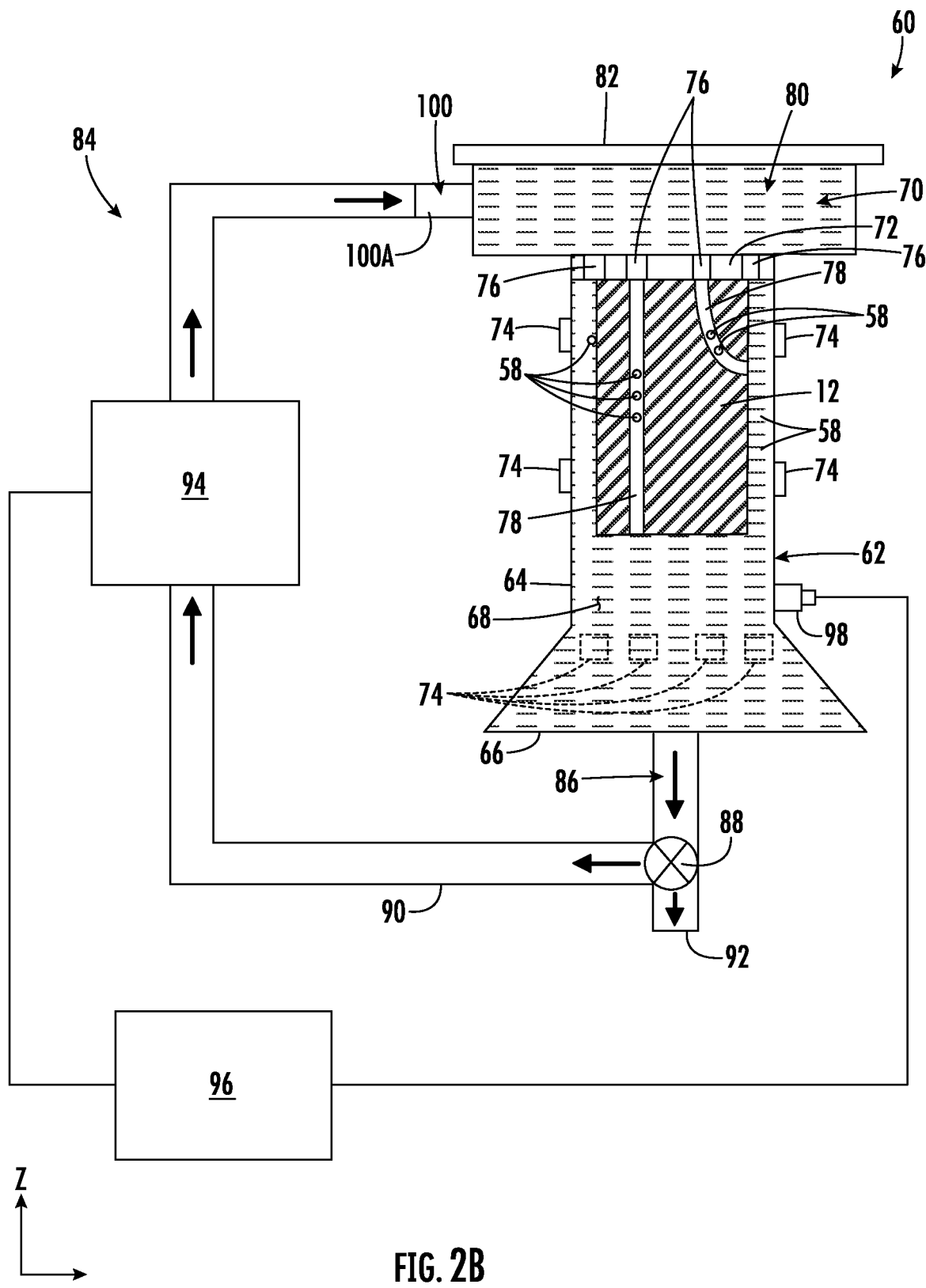
FIG. 2B is a schematic side view of a cleaning system in accordance with various aspects of the present disclosure.

Referring to FIGS. 2A and 2B, schematic drawings of various cleaning systems 60 that may be used to remove residual build material 58 from the component 12 are exemplarily illustrated. In various embodiments, the cleaning system 60 may be capable of conducting one or more processes that may individually or in combination remove at least a portion of the residual build material 58 from the component 12, which may enhance component accuracy or quality. For example, the cleaning system 60 may be configured to flush a cleaning fluid 70 (e.g., a cleaning liquid and/or a cleaning gas) along the component 12 and/or within one or more features 78 of the component 12. The cleaning system 60 may be further configured to at least partially surround the component 12 within a cleaning liquid to remove the residual build material 58. Still further, with the component 12 at least partially submerged, the cleaning fluid 70 may be vibrated to separate the residual build material 58 from the component 12. The various cleaning processes may be implemented in any order for any duration of time based on the component 12 to be cleaned.

As illustrated in FIGS. 2A and 2B, the cleaning system 60 may include a trough or tank 62 that includes tank walls 64 and a tank floor 66, which generally define an interior volume 68 for holding a cleaning fluid 70. The tank walls 64 and tank floor 66 can be fabricated in a sealed arrangement that that may be formed from a metallic material, a polymeric material, and/or any other practicable material without any openings therethrough, except for fluid lines.

In some embodiments, the tank 62 may include an asymmetrical cross-sectional area that is configured to alter a flow rate of the cleaning fluid 70. For example, as illustrated in FIG. 2A, the tank 62 may include a funnel section that feeds a constriction section. In some instances, the tank 62 may have a first flow rate prior to the constriction section and a second flow rate within the constriction section with the second flow rate being higher than the first flow rate. In some instances, the second flow rate may be between 0.25 meters per second (m/s) and 3.5 m/s. However, it will be appreciated that the first flow rate and the second flow rate may be any desired flow rate without departing form the scope of the present disclosure. Moreover, each of the first flow rate and the second flow rate may be laminar or turbulent based on the design of the component 12.

In some instances, one or more fluid movement assemblies 74 (e.g., fluid jets) may be disposed within the funnel section, upstream of the constriction section, and/or near the one or more channels 76 to increase fluid flow along the component 12 and/or through the one or more features 78 of the component 12. Further, in various examples, the fluid movement assembly may be configured to alter a flow rate along a first portion of the component 12 relative to a second portion of the component 12. For instance, the fluid movement assembly 74 may be configured to generate a turbulent flow along the perimeter of the component while maintained a laminar flow through one or more features 78 of the component, or vice versa.

Additionally or alternatively, as illustrated in FIG. 2B, the tank 62 may include a funnel section downstream of the constriction section. In such instances, the tank 62 may have a first flow rate within the constriction section and a second flow rate within the funnel section with the second flow rate being lower than the first flow rate. In some instances, the first flow rate may be between 0.25 meters per second (m/s) and 3.5 m/s. However, it will be appreciated that the first flow rate and the second flow rate may be any desired flow rate without departing form the scope of the present disclosure. Moreover, each of the first flow rate and the second flow rate may be laminar or turbulent based on the design of the component 12. It will be appreciated, however, that the tank 62 may alternatively have any other different geometric cross sections without departing from the scope of the present disclosure. Suitable volumes for the interior volume 68 may also vary depending on particular needs.

In some instances, the one or more fluid movement assemblies 74 (e.g., a suction device) may be disposed within the funnel section, downstream of the constriction section, and/or downstream of the component 12 to increase fluid flow along the component 12 and/or through the one or more features 78 of the component 12. As discussed above, the fluid movement assembly 74 may be configured to alter a flow rate along a first portion of the component 12 relative to a second portion of the component 12. For instance, the fluid movement assembly 74 may be configured to generate a turbulent flow along the perimeter of the component while maintained a laminar flow through one or more features 78 of the component, or vice versa.

With further reference to FIGS. 2A and 2B, in various embodiments, the tank 62 may include one or more fluid movement assemblies 74 along one or more of the sidewalls 64 of the tank 62. The one or more fluid movement assemblies 74 may be configured to provide a suction away from the component 12 and/or a flow towards the component 12 from the sidewall 64. The one or more fluid movement assemblies 74 along the one or more of the sidewalls 64 of the tank 62 may also alter a flow path of the cleaning fluid 70 as the cleaning fluid 70 passes along and/or through the component 12.

Referring further to FIGS. 2A and 2B, in some examples, the component 12 may be selectively retained within the tank 62 through an adaptor 72. The adaptor 72 may suspend the component 12 within the tank 62 so that the cleaning fluid 70 may generally surround the component 12. Moreover, in some instances, the adaptor 72 may define one or more channels 76 that may align with a perimeter of the component 12 and/or one or more features 78 of the component 12. In some examples, the adaptor 72 may include a mesh, sieve, or any other structure with channels 76 to allow fluid to pass therethrough with minimal disruption.

In some instances, the component 12 may be oriented such that one or more of the features 78 are oriented in a predefined manner to encourage flow through preselected features. For instance, the component 12 may be aligned with the adaptor 72 such that the largest features 78 of the component 12 are oriented upwardly to encourage more fluid to enter the component 12 from a fluid circuit 84. Additionally and/or alternatively, the component 12 may be aligned with the adaptor 72 such that the largest features 78 of the component 12 are oriented downwardly to encourage residual build material 58 to exit the component instead of being trapped within the one or more features 78. In other embodiments, the component 12 may be oriented in any other direction based on various design considerations.

In several embodiments, a reservoir 80 may be fluidly coupled with the tank 62. The reservoir 80 may receive the cleaning fluid 70 therein, which, in turn, is delivered to the tank 62. In some instances, a cover 82 may be secured to the reservoir 80 such that the cover 82 may be moved between a closed position to cover the reservoir 80 and an open position to permit access to the reservoir 80. It will be appreciated, however, that in other embodiments, the reservoir 80 may be fluidly coupled with the tank 62 in any other fashion without departing from the scope of the present disclosure.

In some embodiments, such as those illustrated in FIGS. 2A and 2B, the cleaning fluid 70 may be removed from the tank 62 and introduced into the reservoir 80 through a fluid circuit 84. For example, in some embodiments, the fluid circuit 84 may include an outlet line 86 through which the cleaning fluid 70 may exit the tank 62. A valve 88 may be coupled with the outlet line 86 and configured to selectively deliver the cleaning fluid 70 to a supply line 90 and/or a drain 92. The supply line 90 can be a fluid line for transferring the cleaning fluid 70 from the tank 62 through the fluid circuit 84 and back to the tank 62 and/or to the reservoir 80. The drain 92 may be used for discarding the cleaning fluid 70 from the tank 62. In operation, after a given duration, the batch volume of the cleaning fluid 70 may be drained from the tank 62 and/or the reservoir 80, and a fresh batch cleaning fluid 70 may be introduced for subsequent use.

In the illustrated embodiment, a pump 94 is positioned along the fluid circuit 84 and configured to move the cleaning fluid 70 from the outlet line 86 to the reservoir 80. In some embodiments, the pump 94 may be an explosion-proof pump that is rated for use in a hazardous environment as defined by relevant standards within the industry and field. For instance, those who work in the industry and field understand that industry standards organizations set standards and that products are submitted for testing in accordance with such standards in order to receive a certification from one or more of such industry standards organizations. One such organization is Underwriters Laboratories or "UL." Another is Factory Mutual Research of Norwood, Mass. or "FM". A pump submitted for testing by FM and approved as rated to meet an FM standard may be said to have an FM Listing for that standard and be so marked. The pump 94 of the cleaning system 60 may meet the UL standard, the FM standard, and/or any other standard for being defined as an explosion-proof pump. In various examples, the pump 94 may be configured as a centrifugal pump, a positive displacement pump, and/or any other pump to hydraulically convey and circulate the cleaning fluid 70 between the tank 62 and/or the reservoir 80.

In various embodiments, the cleaning fluid 70 can be any liquid and/or a gas that can remove any of the residual build material 58 provided on the component 12. For example, when in liquid form, the cleaning liquid may include water and/or solvents. In embodiments that utilize a solvent, the suitable solvents depend on the build material 58, but can, in general, include organic solvents, which may be of intermediate polarity, such as methanol, methylethylketone, ethanol, isopropyl alcohol, trichloroethane, or the like. When the cleaning fluid 70 is a gas, the gas may be of any practicable form. For example, the gas may be a process gas that is provided by one or more modules (i.e., any device or combination of devices) of the cleaning system 60, such as the pump 94.

With further reference to FIGS. 2A and 2B, the pump 94 may be operably coupled with a cleaning system computing system 96 for selective actuation thereof. The cleaning system computing system 96 in FIGS. 2A and 2B is a generalized representation of the hardware and software that may be implemented to control the operation of the cleaning system 60 described herein. The cleaning system computing system 96 may be embodied, for example, by software running on one or more processors embodied in one or more devices such as a programmable logic controller ("PLC") or a microcomputer. Such processors may be coupled to process sensors and operating components, for example, through wired or wireless connections. The same processor or processors may be used to retrieve and analyze sensor data, for statistical analysis, for feedback control, and/or feedforward control. In addition, it will be appreciated that the cleaning system computing system 96 may be operably coupled with and/or integrated with the apparatus computing system 54. Moreover, it will be appreciated that the apparatus computing system 54 and the apparatus computing system 54 may be a common component.

When the pump 94 is actuated, the cleaning fluid 70 may be moved from the tank 62, to the fluid circuit 84, and onto the reservoir 80. As the cleaning fluid is circulated, the cleaning fluid may contact the residual build material 58 on the component 12 and remove the residual build material 58 from the component 12. Additionally, or alternatively, the cleaning system 60 can include at least one vibration module 98 operably coupled with the tank 62. The vibration module 98 can be any suitable vibratory transducer. For example, the vibration module 98 can include a pneumatically-driven vibration device. One or more vibration modules 98 can be placed on the outside of and/or within the tank 62 in any suitable location to transmit vibrations to the cleaning fluid 70, which in turn, may assist in separating the residual build material 58 from the additively manufactured component 12 when the additively manufactured component 12 is within the tank 62.

In some instances, a filter system 100 may be positioned along a cleaning fluid flow path, which is exemplarily illustrated by arrows within the fluid circuit 84 illustrated in FIGS. 2A and 2B. For example, the filter system 100 may be positioned within the fluid circuit 84. In various embodiments, the filter system 100 may include at least one filter 100A configured to remove at least a portion of the residual build material 58 within the cleaning fluid 70 prior to the cleaning fluid 70 being returned to the reservoir 80, the adaptor 72, and/or the tank 62. The filter system 100 may be removable such that the filter 100A may be interchangeable based on the type of residual build material 58, a soil level, etc., and/or cleaned and returned to the cleaning system 60 once the residual build material 58 is removed from the filter system 100.

In some embodiments, the stage 20 of the apparatus 10 described in reference to FIG. 1 may also form the adaptor 72. For example, the stage 20 may allow the cleaning fluid 70 to pass therethrough. Further, the stage 20 may include one or more channels 76 that align with the one or more features 78 of the component 12. For example, in some embodiments, the stage, or a portion thereof, may be removed from the apparatus 10 and placed within the cleaning system 60 with the component 12 attached thereto. In other embodiments, the cleaning system may surround the stage 20 with the stage 20 remaining the apparatus 10 and the tank 62 surrounding a portion of the stage 20. In some instances, the one or more channels 76 of the stage 20 and/or the adaptor 72 may be plugged during a building operation and unplugged during a cleaning operation.

Figure 3:
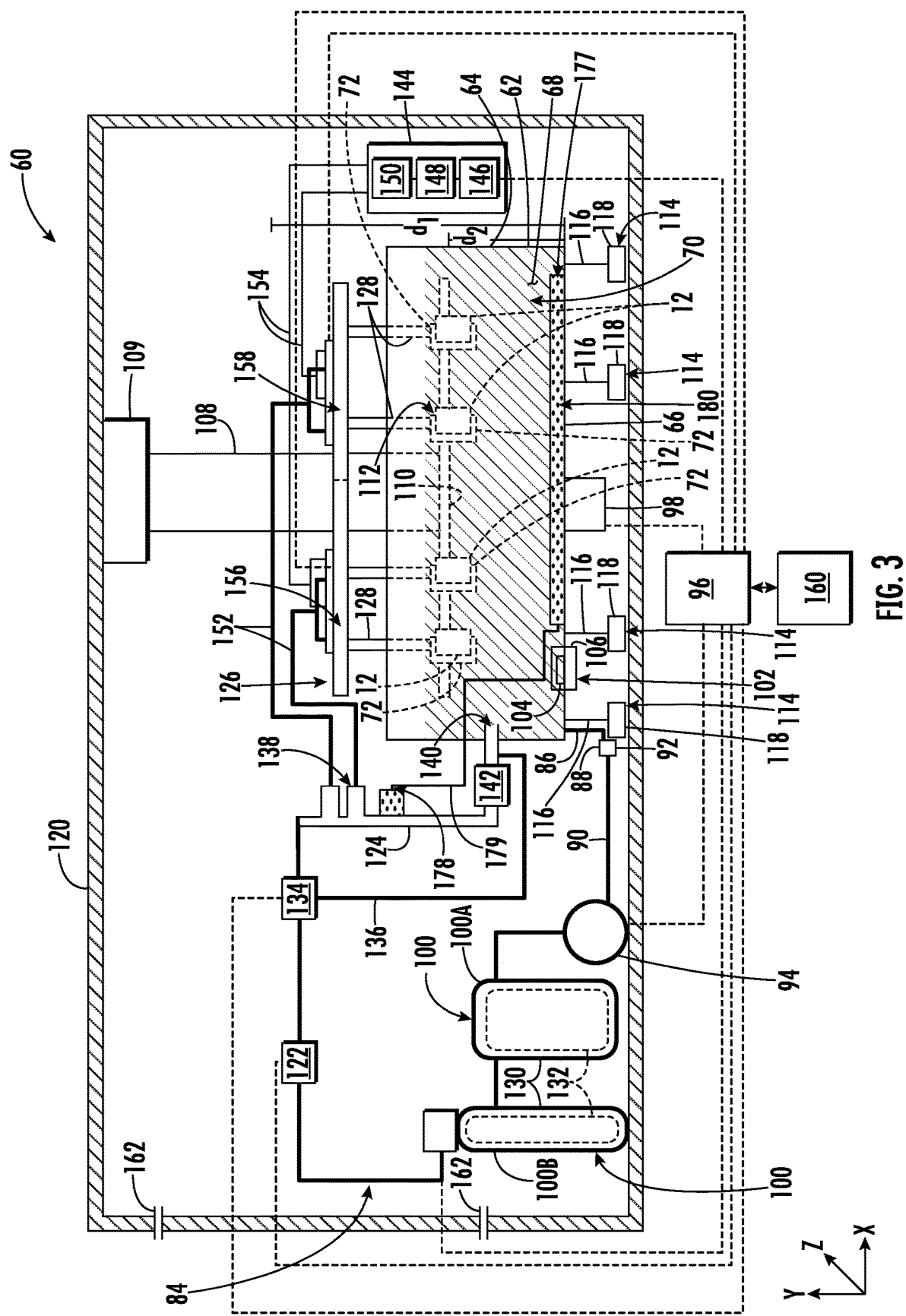
FIG. 3 is a schematic side view of a cleaning system having a support panel and an arm actuator in accordance with various aspects of the present disclosure.

Referring now to FIG. 3, a schematic view of the cleaning system 60 according to various embodiments is illustrated. As provided herein, the cleaning system 60 may be configured to remove the residual build material 58 (FIGS. 2A and 2B) from the component 12 through one or more cleaning processes. For example, in the exemplary embodiment illustrated in FIG. 3, the cleaning system 60 may be configured to remove residual build material 58 from the component 12 by submerging the component 12 within the cleaning fluid, vibrating the cleaning liquid with the component 12 submerged therein, and/or flushing the cleaning liquid along the component 12 and/or through one or more features 78 (FIG. 7) of the component 12. Certain additively manufactured components 12 (e.g., those with complex inner geometry) may benefit from exposure to the cleaning liquid several times and/or in different orientations to enhance residual build material removal. As such, each of the cleaning processes may be completed in any order for any duration of time. Dimensional analysis can be performed on a component 12 to ensure geometric stability of the component 12 for the given duration of exposure in the cleaning liquid.

Similar to the embodiments illustrated in FIGS. 2A and 2B, the cleaning system 60 includes a tank 62 having tank walls 64 and a tank floor 66, which define interior volume 68 for holding the cleaning liquid. In some embodiments, an agitator 102 may be coupled with the tank floor 66 and configured to reduce separation of the residual build material 58 and the cleaning liquid in the tank 62. In some examples, the agitator 102 may include a movable element 104 (e.g., a magnetic spinner) within the tank 62 and an actuation device 106 positioned externally from the tank 62. For purposes of convenient description, the tank floor 66 may be considered to be oriented parallel to an X-Y plane of the cleaning system 60, and a direction perpendicular to the X-Y plane is denoted as a Z-axis direction (X, Y, and Z being three mutually perpendicular directions).

An arm actuator 108 may be positioned proximately to the tank 62 and configured to move a support panel 110 affixed thereto between at least a first position and a second position. The support panel 110 may be configured to support the component 12 either through coupling the component 12 to the support panel 110, either with or without an adaptor 72. In various embodiments, the arm actuator 108 may be coupled with a static support 109.

In the first position, the support panel 110 may be located a first distance $d_1$ from the tank floor 66. In the second position, the support panel 110 may be located a second distance $d_2$ (as shown in FIG. 3) from the tank floor 66. In various examples, the second distance is less than the first distance. The arm actuator 108 may be configured as a pneumatic cylinder. Additionally, or alternatively, the arm actuator 108 may be configured as one or more of a ballscrew electric actuator, linear electric actuator, hydraulic cylinder, delta drive, or any other practicable device. In addition to, or as an alternative to, making the support panel 110 movable, the tank 62 may be operably coupled with the arm actuator 108.

The support panel 110 may be configured to retain one or more components 12 there along. In some instances, one or more components 12 may extend downwardly from the support panel 110. However, the one or more components 12 may also extend upwardly and/or generally align with the support panel 110 without departing from the teachings provided herein. In various examples, the support panel 110 may be formed from a metallic material, a polymeric material, and/or any other material that may be capable of contact with the cleaning fluid 70 with minimal to no degradation.

In some embodiments, an adaptor 72 may be utilized for coupling each of the components 12 to the support panel 110. In various examples, the adaptor 72 may have a retention assembly 112 for maintaining a generally constant position of the adaptor 72 relative to the support panel 110 while maintaining each of the components 12 in a predefined position.

As illustrated in FIG. 3, the cleaning system 60 may further include a vibration module 98 that may be operably coupled with the tank 62 and configured to vibrate the cleaning liquid within the tank 62 at a pre-defined pressure. In some instances, a pneumatic pressure may dictate the amplitude of the vibration. As described with reference to FIGS. 2A and 2B, the vibration module 98 can be a pneumatic vibratory transducer that includes a pneumatically-driven vibration module 98. One or more vibration modules 98 can be placed on the outside of and/or within the tank 62 in any suitable location to transmit vibrations/oscillations to the cleaning liquid, which in turn, may assist in separating the residual build material 58 from the additively manufactured component 12 when the support panel 110 is placed in the second position.

In various embodiments, the tank 62 may be supported by vibration-isolating feet 114 that may assist in isolating the vibration of the tank 62 from the remaining modules of the cleaning system 60. The vibration may be produced as the cleaning liquid within the tank 62 is oscillated, when the agitator 102 is operated, when the support panel 110 is moved between the first and second positions, and/or through the actuation of any other module of the cleaning system 60. In some embodiments, such as the one illustrated in FIG. 3, the vibration-isolating feet 114 include a support structure 116 and base structure 118. The support structure 116 may be operably coupled with the tank 62 on a first portion thereof and with the base structure 118 on a second portion of the support structure 116. The length of the support structure 116 may be adjustable to place the tank 62 in a desired orientation. The base structure 118 may be positioned between the second portion of the support structure 116 and a cleaning system housing 120, a ground structure, and/or any other structure. In various embodiments, the base structure 118 may be formed from a motion attenuating material, such as any of a wide variety of elastomers including, but not limited to, natural rubber and polychloroprene, also known as neoprene.

With further reference to FIG. 3, in several embodiments, the tank 62 may be coupled with a fluid circuit 84, in which the fluid circuit may accept the cleaning fluid 70 from the tank through an outlet line 86. The fluid circuit 84 may direct fluid from the tank 62 through a pump 94, one or more filters 100A, 100B, a temperature control system 122, and back to the tank 62. The cleaning liquid 70 may be returned to the tank 62 through a conduit 124 and/or through a manifold 126. In some embodiments, the manifold 126 may include one or more hoses 128 and/or couplers 242 (FIG. 7) that are operably coupled with the component 12 and/or the adaptor 72 for directing the cleaning liquid into the one or more features 78 (FIG. 10) of the component 12 and/or along the component 12.

As provided herein, the one or more pumps 94 may be used to move the cleaning fluid 70 through the fluid circuit 84. In various examples, the pump 94 may be configured as a centrifugal pump, a positive displacement pump, and/or any other pump to hydraulically convey and circulate the cleaning liquid in and through the tank 62 and/or the reservoir 80. Further, in some embodiments, the pump 94 may be an explosion-proof pump, as discussed with reference to the embodiment described in FIGS. 2A and 2B.

The filter system 100 may include one or more filters 100A, 100B that are positioned upstream and/or downstream of the pump 94. The filter system 100 may be configured to remove at least a portion of the residual build material 58 within the cleaning liquid prior to the cleaning liquid being delivered to the reservoir 80 (FIG. 2A), the manifold 126, the adaptor 72, and/or the tank 62. To this end, the one or more filters 100A, 100B may be determined based on the type of build material 58 used to create the component 12. Moreover, the types of filters can also influence a size of the pump size and/or a power of the pump within the fluid circuit 84.

In some instances, an explosion-proof pump 94 may be configured to move the cleaning liquid through the fluid circuit 84 and through the manifold 126. In other embodiments, a first, explosion-proof pump 94 may be utilized to move the cleaning fluid through the filter system 100 and a second pump 94, which may be a peristaltic pump, may push the cleaning liquid through the manifold 126.

Each of the filters 100A, 100B may include a casing 130 and a filter element 132 within each respective casing 130. The filter elements 132 may prevent various suspended solids contained in the cleaning liquid (e.g., residual build material 58, sediment, dirt, etc.) from passing through the filter 100A, 100B. In various examples, the filter element 132 may retain dissolved contaminants in the cleaning liquid (e.g., residual build material 58) and particulates down to 5, microns, 3 microns, 1 micron, 0.5 microns, 0.1 microns, and/or any other size. In embodiments including more than one filter, each filter 100A, 100B may be of a varied type and/or configured to filter a varied size of particle. Moreover, each of the one or more filters 100A, 100B may be configured as a surface filter (e.g., a solid sieve which traps the solid particles, with or without the aid of filter paper such as a Buchner funnel, belt filter, rotary vacuum-drum filter, crossflow filters, screen filter), a depth filter (e.g., a bed of granular material which retains the solid particles as it passes, such as a sand filter), and/or any other type of practicable filter.

Referring still to FIG. 3, the temperature control system 122 may be operably coupled with the fluid circuit 84. The temperature control system 122 may be configured to raise and/or reduce a temperature of the cleaning liquid as the cleaning liquid passes through the fluid circuit 84, which may increase the efficiency of the cleaning system 60 and/or provide any other benefit. In various examples, the temperature control system 122 may include a chiller and/or a heat exchanger. The heat exchanger may be configured as a shell and tube heat exchanger, a plate heat exchanger, a plate and shell heat exchanger, an adiabatic wheel heat exchanger, a plate fin heat exchanger, a pillow plate heat exchanger, a fluid heat exchanger, a waste heat recovery unit, a dynamic scraped surface heat exchanger, a phase-change heat exchanger, a direct contact heat exchanger, a microchannel heat exchanger, and/or any other type of heat exchanger.

In various embodiments, a three-way valve 134 may be positioned between the pump 94, a conduit 124, and a by-pass pipe 136. In a first position, the three-way valve 134 may direct the cleaning liquid within the fluid circuit 84 from the pump 94 to the conduit 124. The conduit 124, in turn, can direct the cleaning liquid towards the manifold 126 through one or more conduit outlets 138 and/or through a tank return line 140. In some embodiments, the manifold 126 is operably coupled with the one or more conduit outlets 138 through one or more manifold lines 152.

A two-way valve 142 may separate the tank return line 140 from the one or more conduit outlets 138. As such, in some instances, when the three-way valve 134 directs fluid to the conduit 124 with the two-way valve 142 in a closed position, the cleaning liquid is directed through the one or more conduit outlets 138. When the three-way valve 134 directs fluid to the conduit 124 with the two-way valve 142 in an open position, the cleaning liquid is directed through the one or more conduit outlets 138 and through the tank return line 140.

In a second position, the three-way valve 134 may direct the cleaning liquid within the fluid circuit 84 from the pump 94 to the by-pass pipe 136. The by-pass pipe 136 may be fluidly coupled with the conduit 124 at a position between the two-way valve 142 and the tank return line 140. As such, when the three-way valve 134 is in the second position and the two-way valve 142 is in the closed position, the cleaning liquid may by-pass the one or more conduit outlets 138 and returned to the tank 62.

With further reference to FIG. 3, in various embodiments, the cleaning system 60 may include a gas supply 144 operably coupled to the manifold 126. The gas supply 144 may be configured to provide a cleaning gas through the manifold 126 and along the component 12 and/or into one or more features 78 (FIG. 10) of the component 12. In some instances, the cleaning gas may generally be high volume, low pressure (HVLP) to prevent degradation of the structure of the component 12 while removing the residual build material 58 from the component 12.

In various embodiments, the gas supply 144 may be shop gas (e.g., process air) that is provided through the operation of a module of the cleaning system 60 and/or provided by a blower/compressor 146. The cleaning gas may be directed through a filter 148, which may be configured as a high efficiency particulate arrester (HEPA) filter and/or any other type of practicable filter. From the filter 148, the cleaning gas may be passed through a regulator 150, which may reduce (or increase) a pressure of the cleaning gas prior to the cleaning gas entering the manifold 126, which may then direct the cleaning gas to one or more of the additively manufactured components 12.

Referring still to FIG. 3, in various embodiments, the manifold 126, like the support panel 110 may be coupled to the arm actuator 108 in a fixed relationship and/or in a translatable manner relative to the support panel 110 (e.g., through a separate actuator). In embodiments in which the manifold 126 is affixed to the arm actuator 108, the manifold 126 may move in conjunction with the support panel 110 as the support panel 110 is moved between the first and second positions. In some instances, unlike the support panel 110, however, the manifold 126 may be positioned above the cleaning liquid within the tank 62 when the support panel 110 is in both of the first and second positioned. It will be appreciated that, in other embodiments, the manifold 126 may be affixed to any other module or structure without departing from the teachings provided herein.

In the embodiment illustrated in FIG. 3, the manifold 126 may include one or more hoses 128 that can be operably coupled with the component 12 and/or the adaptor 72 for directing the cleaning liquid into the one or more features 78 (FIG. 10) of the component 12 and/or along the component 12. In embodiments in which the manifold 126 is operably coupled with the arm actuator 108, each of the one or more hoses 128 may have a first length as the hoses 128 also move in conjunction with the manifold 126 and the support panel 110. In embodiments in which the manifold 126 does not move in conjunction with the support panel 110, the one or more hoses 128 may be of a second length. In various embodiments, the second length may be longer than the first to accommodate for the change in distance between the manifold 126 and the support panel 110 as the support panel 110 is moved between the first position and the second position.

The manifold 126 may include one or more segments 156, 158 with each segment 156, 158 being fed a cleaning liquid from the fluid circuit 84 through a respective manifold line 152 operably coupled with the fluid circuit 84 and/or a cleaning gas from the gas supply 144 through a respective gas line 154. However, it will be appreciated that various segments 156, 158 may be provided with a cleaning fluid 70 through a common supply line.

Each of the one or more segments 156, 158 of the manifold 126 may be independently controllable relative to one another. For example, the first segment 156 and the second segment 158 may each include a respective solenoid bank. Each solenoid bank may include one or more valves for controlling the cleaning liquid output through each hose 128. For instance, each hose 128 may be fluidly coupled with a pair of valves within a respective solenoid bank. When the first valve is opened and the second valve is closed, a cleaning liquid may be provided through the respective hose 128. When the first valve is closed and the second valve is opened, a cleaning gas may be provided through the respective hose 128. When the first valve and the second valve are both opened, a mixed cleaning liquid may be provided through the respective hose 128, which may create a foam in which the cleaning liquid includes bubbles generated by the cleaning gas. When the first valve and the second valve are both closed, the hose 128 may be free from cleaning liquid flow. However, any other system capable of allowing a cleaning liquid, a cleaning gas, a mixed cleaning fluid 70, and/or a blockage of cleaning fluid 70 through the hose 128 may be used in place of or in conjunction with the system described herein, such as a three-way valve.

In some examples, a tank sweep device 177 may be positioned within the tank 62 and fluidly coupled with a sweep outlet 178 through a sweep line 179. The tank sweep device 177 may define a plurality of openings 180 there along that are configured to direct cleaning fluid 70 along a lower portion of the tank 62. The movement of the cleaning fluid 70 along the lower portion of the tank 62 may be configured to reduce separation of the residual build material 58 and the cleaning fluid 70 in the tank 62.

In the illustrated embodiment, the cleaning system 60 may include a cleaning system housing 120, which may be used to provide a shielding or inert gas (e.g., a "process gas") atmosphere using gas ports 162. Optionally, pressure within the cleaning system housing 120 could be maintained at a desired level greater than or less than atmospheric. Optionally, the cleaning system housing 120 could be temperature and/or humidity controlled. Optionally, ventilation of the cleaning system housing 120 could be controlled based on factors such as a time interval, temperature, humidity, and/or chemical species concentration. In some embodiments, the cleaning system housing 120 can be maintained at a pressure that is different than an atmospheric pressure.

In some instances, the cleaning fluid 70 utilized within the cleaning system 60 may be a solvent that may be flammable. As such, the vibration module 98 and the arm actuator 108 may be pneumatically controlled. In addition, portions of the pump 94, the temperature control system 122, and/or the gas supply 144 that are positioned within the cleaning system housing 120 may generally be explosion-proof to mitigate any operational issues.

Further, the cleaning system computing system 96 may be communicatively coupled with a human-machine interface (HMI) 160, each of which may be positioned externally from the cleaning system housing 120. The HMI 160 may provide information related to the cleaning system 60 to the operator and/or allow the operator to interface with the cleaning system computing system 96 to alter one or more settings or operations of the cleaning system 60.

Figure 4:
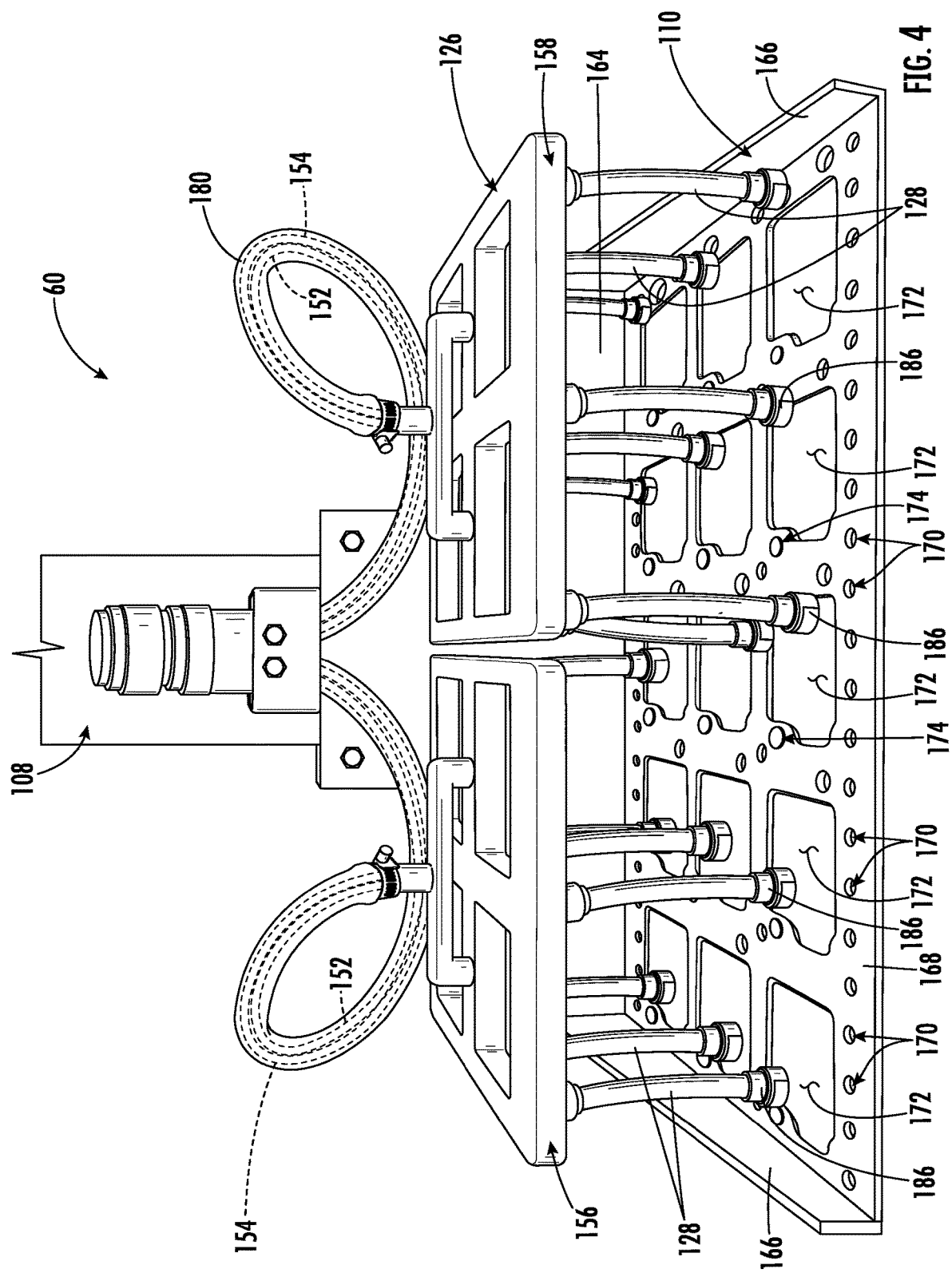
FIG. 4 is a front perspective view of a manifold and a support panel operably coupled with the arm actuator in accordance with various aspects of the present disclosure.
Figure 5:
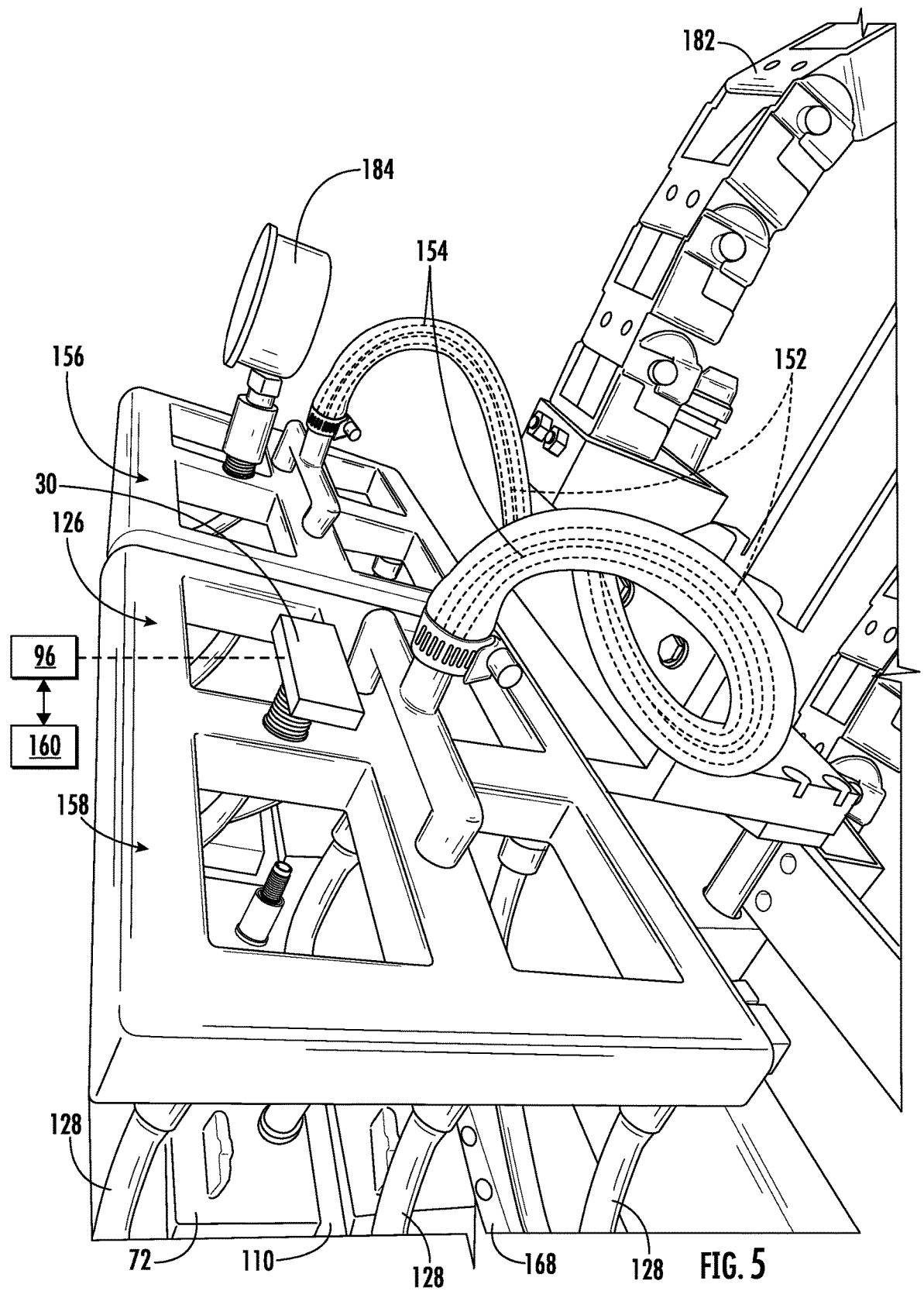
FIG. 5 is a top perspective view of the manifold and the support panel in accordance with various aspects of the present disclosure.
Figure 6:
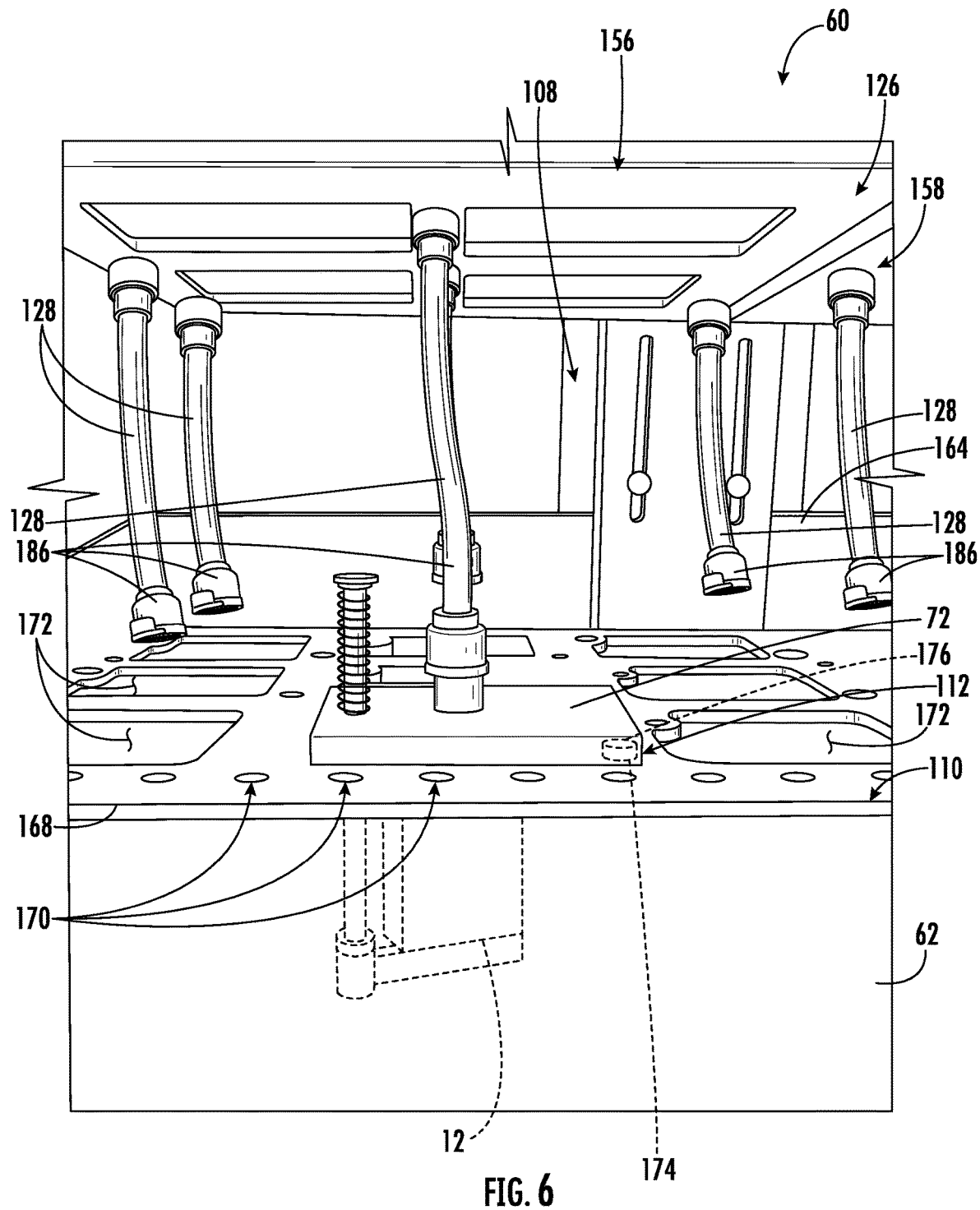
FIG. 6 is a front perspective view of the manifold and the support panel in accordance with various aspects of the present disclosure.

With reference to FIGS. 4-6, various views of the support panel 110, the manifold 126, and the arm actuator 108 are exemplarily illustrated. As illustrated, the support panel 110 may include a backing plate 164, a pair of side plates 166, and a base plate 168. The backing plate 164 and the side plates 166 may be coupled to or integrally formed with the base plate 168.

The base plate 168 may define one or more through-holes 170. Each through-hole 170 allows the cleaning liquid within the tank 62 to pass therethrough as the support panel 110 is moved from the first position to the second position and/or the second position to the first position thereby reducing the amount of resistance provided by the support panel 110 on the arm actuator 108 during movement. By reducing the amount of resistance provided by the support panel 110 during movement between the second position and the first position, or vice versa, the amount of power needed to actuate the arm actuator 108 may be reduced. In addition, the one or more through-holes 170 may reduce cavitation as the support panel 110 is moved from the first position to the second position and/or the second position to the first position. Additionally or alternatively, the one or more through-holes 170 may minimize cycle time from an oscillation process to a vibration process by reducing the liquid cavitation and, thus, a dwell process after the oscillation and vibration processes allowing the cleaning solution to settle in less time.

The base plate 168 may further define one or more component voids 172. A component 12 may be suspended within a respective component void 172. In some instances, the component 12 may be coupled with the adaptor 72, which is then further coupled to the base plate 168 to retain the component 12 within the component void 172.

The retention assembly 112 may be used to removably couple the adaptor 72 to the support panel 110. For example, the retention assembly 112 may include a pair of magnets 174, 176 with a first magnet 174 positioned within the support panel 110 and a second magnet 176 positioned within the adaptor 72. As such, through magnetic coupling of the first magnet 174 and the second magnet 176, the adaptor 72 may be retained on the support panel 110. Further, each of the first magnet 174 and the second magnet 176 may be positioned in defined position to create a poka-yoke design in which the adaptor 72 is aligned in a predefined orientation when the first and second magnets 174, 176 are aligned with one another. In other embodiments, the retention assembly 112 may additionally or alternatively include a clamp, a clip, and/or any other device capable of retaining the adaptor 72 in a defined position relative to the support panel 110.

With further reference to FIGS. 5 and 6, as provided above, the manifold 126 includes first and second segments 156, 158. Each segment 156, 158 includes a manifold line 152 that can receive the cleaning liquid from the fluid circuit 84 (FIG. 3) and a cleaning gas line 154 from the gas supply 144 (FIG. 3). Each of the manifold line 152 and the gas line 154 may be directed along the arm actuator 108 and positioned within a retainer system 182. The retainer system 182 may be configured to maintain each of the manifold line 152 and the gas line 154 as the position of the manifold 126 is altered.

The manifold 126 may include one or more pressure gauges 184 that are configured to monitor a pressure of the cleaning fluid 70 (FIG. 3) (e.g., cleaning liquid and/or the cleaning gas). In some instances, the one or more pressure gauges 184 may be operably coupled with the cleaning system computing system 96 and/or the HMI 160. When a pressure falls outside of a predefined range, as detected by the one or more pressure gauges 184, a notification may be provided on the HMI 160 and/or through any other practicable device.

Each segment 156, 158 of the manifold 126 can include one or more hoses 128 that may be operably coupled with the adaptor 72 and/or the additively manufactured component 12. In some instances, a connector assembly 186 may be coupled to an end portion of each respective hose 128 that allows for fluid coupling of the hose 128 to the additively manufactured component 12, with or without an adaptor 72.

Referring to FIGS. 7-10, side perspective views of the manifold 126 and the support panel 110 are illustrated in which the distance between the manifold 126 and the support panel 110 may be altered. For example, in some embodiments, the arm actuator 108 may be configured to translate both the manifold 126 and the support panel 110 simultaneously between a plurality of positions, including at least a position in which the support panel 110 is within the tank 62 and a position in which the support panel 110 is above the tank 62. In addition, the manifold 126 may be operably coupled with a manifold actuator 240 that translates the manifold 126 towards and away from the support panel 110. Like the arm actuator 108, the manifold actuator 240 may be configured as a pneumatic cylinder. Additionally, or alternatively, the manifold actuator 240 may be configured as one or more of a ballscrew electric actuator, linear electric actuator, hydraulic cylinder, delta drive, or any other practicable device.

In some embodiments, such as the one illustrated in FIGS. 7-10, the manifold 126 may include a plurality of couplers 242 extending from the manifold 126 that can be positioned within the component 12 and/or the adaptor 72 for directing the cleaning liquid into the one or more features 78 (FIG. 10) of the component 12 and/or along the component 12.

As provided herein, the manifold 126 may include one or more segments 156, 158 with each segment 156, 158 being fed a cleaning liquid from the fluid circuit 84 (FIG. 3) through a respective manifold line 152 operably coupled with the fluid circuit 84 and/or a cleaning gas from the gas supply 144 (FIG. 3) through a respective gas line 154. However, it will be appreciated that various segments 156, 158 may be provided with a cleaning fluid 70 through a common supply line.

Each of the one or more segments 156, 158 of the manifold 126 may be independently controllable relative to one another. For example, the first segment 156 and the second segment 158 may each include a respective solenoid bank. Each solenoid bank may include one or more valves for controlling the cleaning liquid output through each coupler 242. For instance, each coupler 242 may be fluidly coupled with a pair of valves within a respective solenoid bank. When the first valve is opened and the second valve is closed, a cleaning liquid may be provided through the respective coupler 242. When the first valve is closed and the second valve is opened, a cleaning gas may be provided through the respective coupler 242. When the first valve and the second valve are both opened, a mixed cleaning liquid may be provided through the respective coupler 242, which may create a foam in which the cleaning liquid includes bubbles generated by the cleaning gas. When the first valve and the second valve are both closed, the coupler 242 may be free from cleaning liquid flow. However, any other system capable of allowing a cleaning liquid, a cleaning gas, a mixed cleaning fluid, and/or a blockage of cleaning fluid through the coupler 242 may be used in place of or in conjunction with the system described herein, such as a three-way valve.

Figure 7:
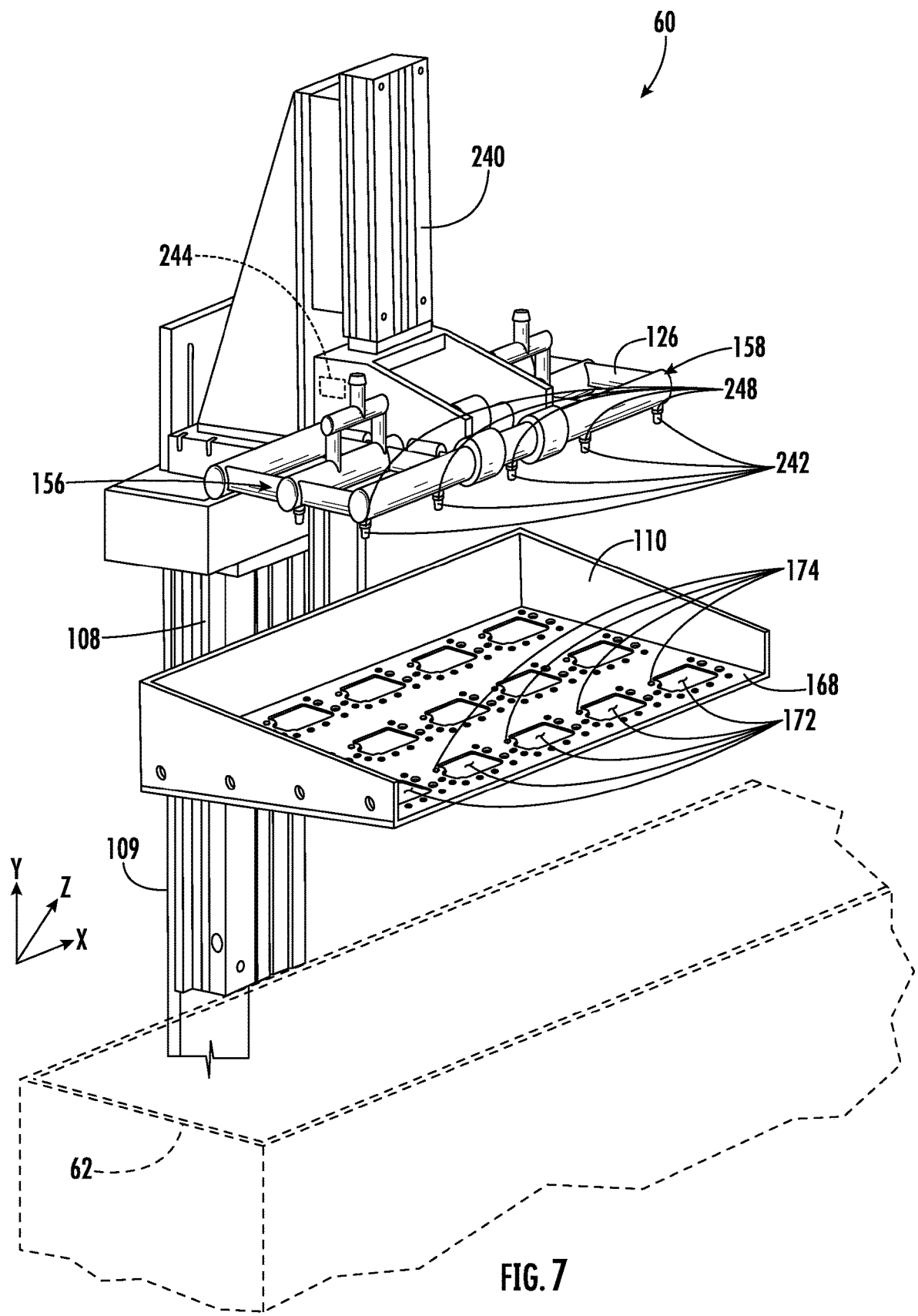
FIG. 7 is a side perspective view of the manifold operably coupled with a manifold actuator that alters a position of the manifold relative to the support panel in accordance with various aspects of the present disclosure.

In operation, as illustrated in FIG. 7, the manifold 126 and the support panel 110 may be positioned above the tank 62 with the manifold 126 separated from the support panel 110. When separated, the component 12 may be positioned within a component void 172. In some instances, the component 12 may be coupled with the adaptor 72 (FIG. 8), which is then further coupled to the base plate 168 to retain the component 12 within the component void 172.

Figure 8:
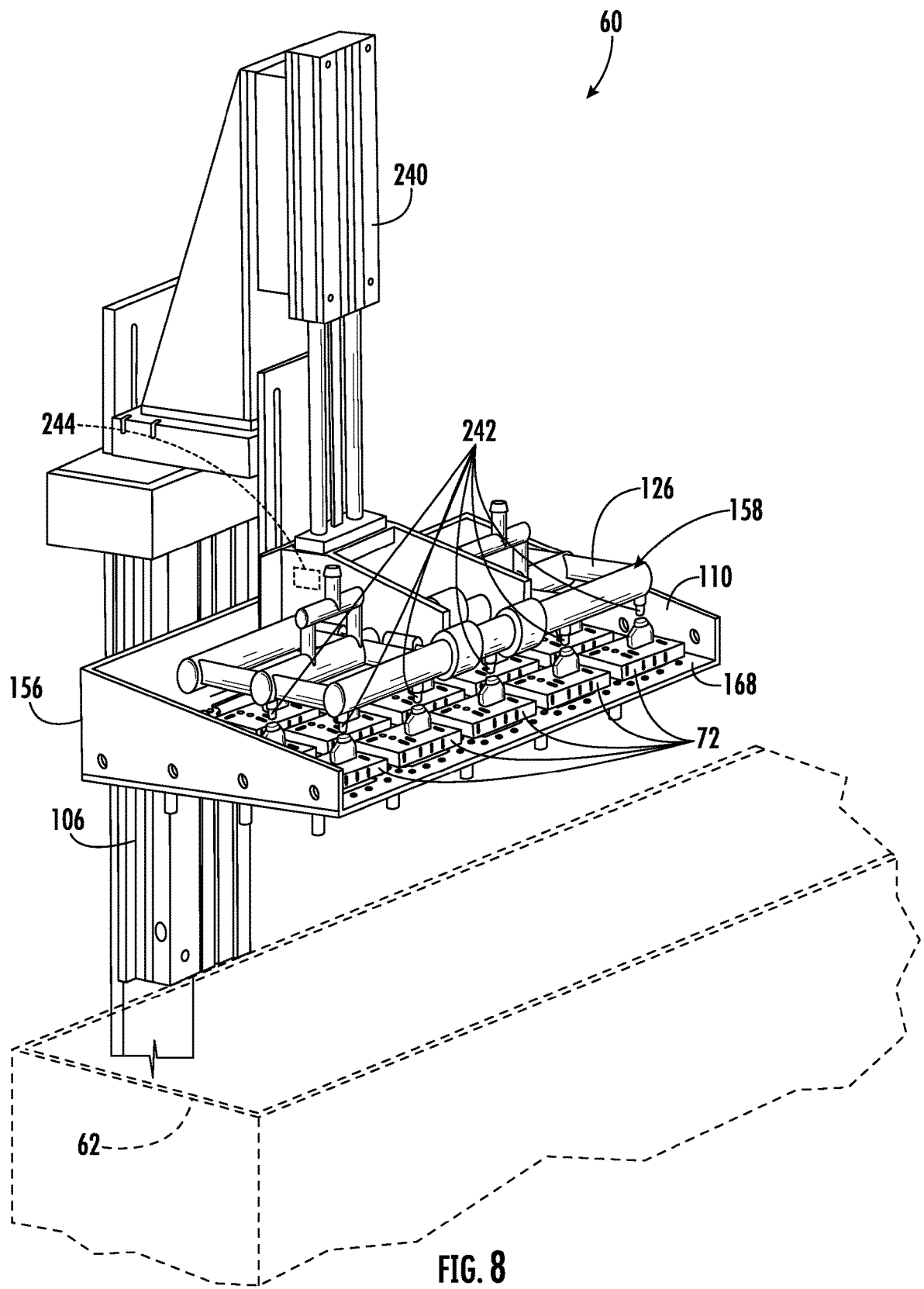
FIG. 8 is a side perspective view of the manifold operably coupled with the manifold actuator with the manifold positioned over a plurality of components positioned within the support panel in accordance with various aspects of the present disclosure.
Figure 9:
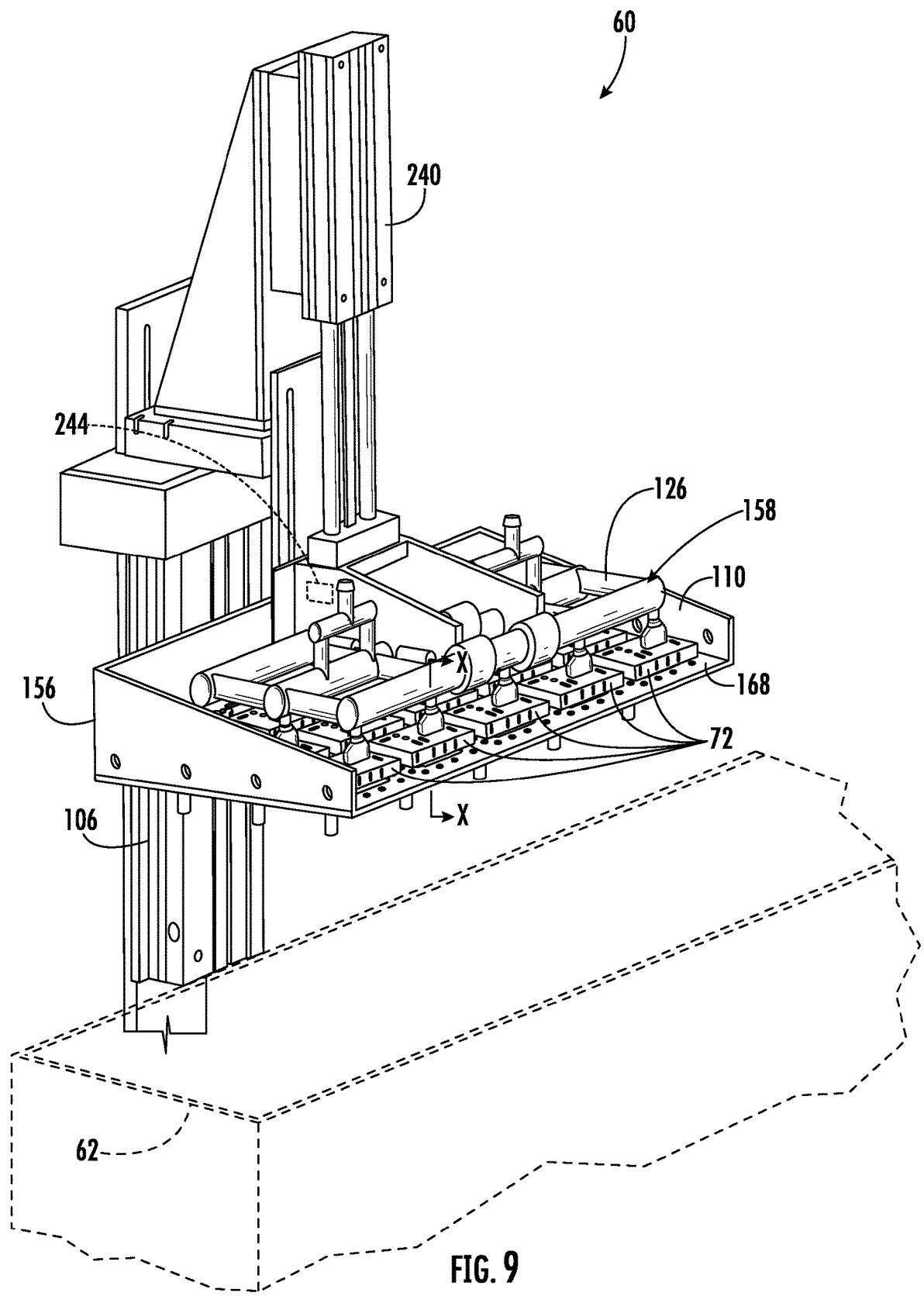
FIG. 9 is a side perspective view of the manifold operably coupled with the manifold actuator with the manifold having a plurality of couplers fluidly coupled with one or more adaptors in accordance with various aspects of the present disclosure.

As illustrated in FIG. 8, with the component 12 positioned within a component void 172 and/or the component 12 coupled with the adaptor 72 to retain the component 12 within the component void 172, the manifold 126 may be translated towards the support panel 110. As illustrated, each of the plurality of couplers 242 defined by the manifold 126 may align with the adaptors 72. As illustrated in FIG. 9, the manifold 126 may continue to translate towards the support panel 110 until the manifold 126 is separated from the support panel 110 by a predefined distance and/or until the plurality of couplers 242 are fluidly coupled with the components 12 and/or the adaptors 72. Accordingly, once the component 12 is positioned within a component void 172 and/or the component 12 is coupled with the adaptor 72 to retain the component 12 within the component void 172, the cleaning system 60 may be configured to fluidly couple the manifold 126 to the components 12, with or without an adaptor 72 and with or without operator intervention.

In some instances, the manifold actuator 240 is operably coupled with the computing system 96 and is configured to move a defined distance to separate and couple with the components 12 and/or the adaptors 72. In some examples, the manifold 126 and/or the manifold actuator 240 may include a position sensor 244 that is configured to determine a movement location of the manifold 126 based on a detected condition. In some instances, the detected condition may be a pressure sensed as the manifold 126 is pressed against the components 12 and/or the adaptors 72. Additionally or alternatively, the detected condition may be the support panel 110, the components 12, and/or the adaptors 72 being within a predefined distance of the manifold 126. It will be appreciated that the detected condition may be any condition and the sensor 244 may be of any practicable type for detecting a defined condition.

It will be appreciated that, in some embodiments, the support panel 110 may be movable relative to the manifold 126 rather than the manifold 126 being movable relative to the support panel 110 without departing from the teachings of the present disclosure.

Figure 10:
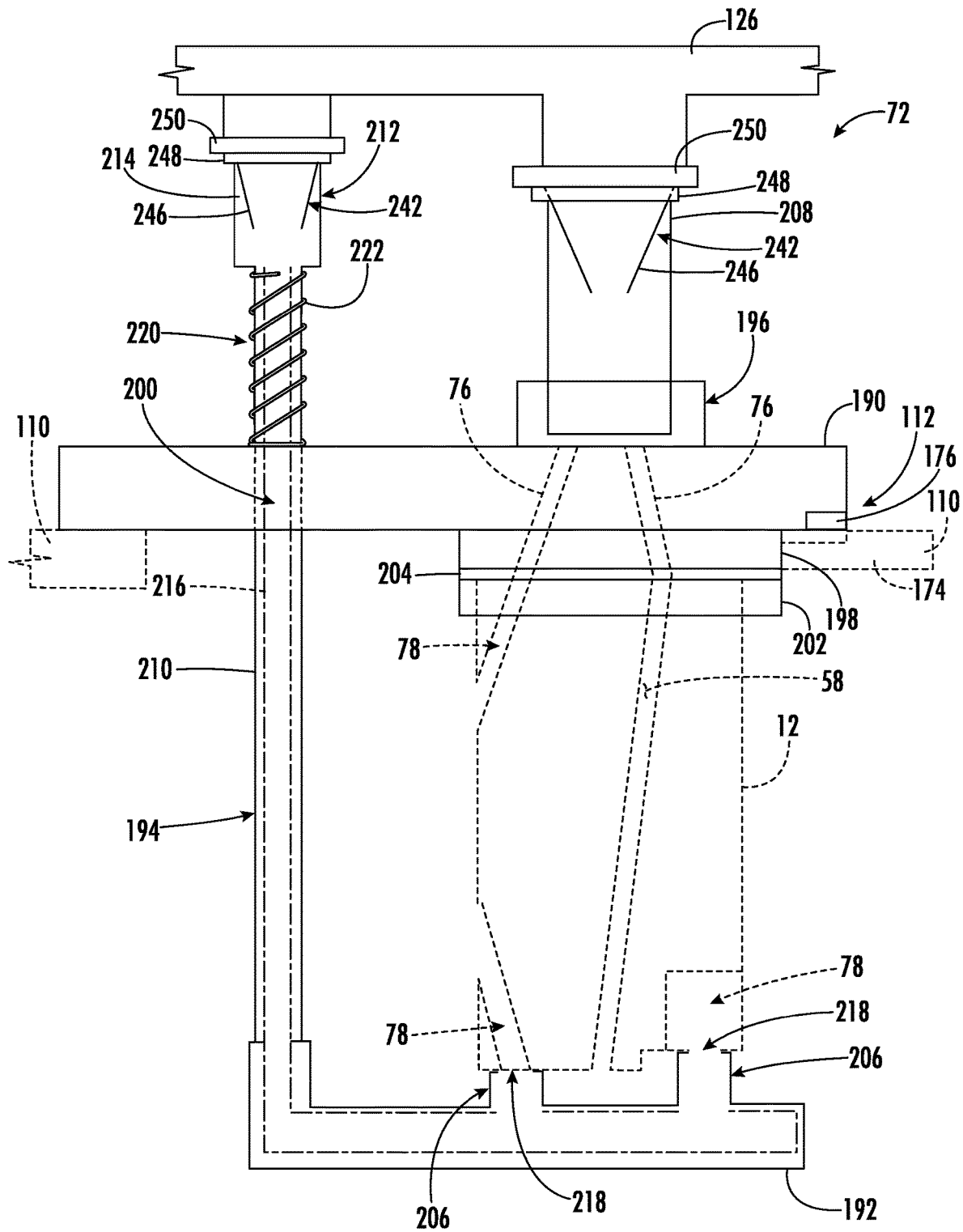
FIG. 10 is a cross-sectional view of an adaptor configured to couple a component to the support panel taken along the line X-X of FIG. 9 in accordance with various aspects of the present disclosure.

With reference to FIG. 10, a cross-sectional view of the manifold 126 and the adaptor 72 is illustrated in accordance with various embodiments of the cleaning system 60. As provided herein, the adaptor 72 may be configured to retain the component 12 in a generally predefined position during operation of the cleaning system 60. In various embodiments, the adaptor 72 may include a first portion 190 and a second portion 192. The additively manufactured component 12 may be compressively retained between the first portion 190 and the second portion 192. An adjustment assembly 194 may operably couple the second portion 192 to the first portion 190 and allow for movement of the second portion 192 relative to the first portion 190.

In several embodiments, the first portion 190 of the adaptor 72 can define an adaptor inlet 196, an adaptor outlet 198, one or more channels 76 extending between the adaptor inlet 196 and the adaptor outlet 198, and/or an adjustment assembly void 200. The adaptor inlet 196 may define a retention structure, such as threads or another retention structure. A first interface 208 may be attached to the adaptor inlet 196 on a bottom portion (or any other portion) of the first interface 208. A top portion (or any other portion) of the first interface 208 may be operably coupled with the coupler 242 of the manifold and/or with the connector assembly 186 (FIG. 6) of the hose 128 such that the cleaning fluid 70 may be accepted from the manifold through the first interface 208 and into the one or more channels 76 (FIG. 10) of the adaptor 72.

The adaptor outlet 198 may include a rim 202 that at least partially surrounds a portion of the additively manufactured component 12. The adaptor outlet 198 is configured to exhaust the cleaning fluid 70 towards one or more features

78 of the additively manufactured component 12 and/or along the additively manufactured component 12.

In some instances, an adaptor gasket 204 may be positioned within the adaptor outlet 198 and configured to be at least partially positioned between the adaptor outlet 198 and the additively manufactured component 12 when the additively manufactured component 12 is positioned within the adaptor 72. To better retain the adaptor gasket 204, the adaptor outlet 198 of the first portion 190 may define a groove that the adaptor gasket 204 is partially nested within. In various embodiments, the adaptor gasket 204 may be formed from an elastomeric material and/or any other compressible material. As such, the adaptor gasket 204 may be capable of establishing a generally fluid-tight seal between the adaptor outlet 198 and the additively manufactured component 12.

The second portion 192 of the adaptor 72 may define one or more locators 206 that are configured to mate with various features 78 of the additively manufactured component 12 to assist in retaining the component 12 between the first and second portions 190, 192. In various embodiments, the second portion 192 covers less than the full bottom portion of the component 12 and/or is positioned away from one or more features 78 of the component 12. As such, when the component 12 is positioned within the adaptor 72 and lowered into the cleaning liquid within the tank 62, the cleaning liquid 70 (FIG. 3) may enter various features 78 of the component 12 to remove the residual build material 58.

The adjustment assembly 194 may include a rod 210 that may be slidably positioned through the adjustment assembly void 200 of the first portion 190 and/or otherwise coupled with the first portion 190 of the adaptor 72. The rod 210 may be coupled with the second portion 192 of the adaptor 72 on a first side of the adjustment assembly void 200 and a stop 212 on the second side of the adjustment assembly void 200. In various embodiments, the stop 212 may be configured as a second interface 214 that is configured to couple with a coupler 242 and/or the connector assembly 186 (FIG. 6) of a hose 128 (FIG. 6). The second interface 214 may direct cleaning fluid (FIG. 3) into a passage 216 defined by the rod 210. The cleaning fluid 70 may then be directed through one or more apertures 218 within the second portion 192 of the adaptor 72. In some instances, the one or more apertures 218 align with various features 78 of the additively manufactured component 12. Further, the one or more apertures 218 may be defined within the one or more locators 206. Alternatively, in some embodiments, the stop 212 may be any structure that is fixed to the rod 210 on an opposing side of the adjustment assembly void 200 from the second portion 192 of the adaptor 72. In various embodiments, the adjustment assembly 194 may also be used as a handle and/or a handle may be otherwise incorporated onto the adaptor 72.

In some embodiments, such as the one illustrated in FIG. 10, the coupler 242 may define a nozzle 246. A nozzle gasket 248 is positioned about the nozzle 246. An obstruction 250 may be positioned on an opposing side of the nozzle gasket 248 from the nozzle 246 and is configured to prevent the nozzle gasket 248 from moving upwardly beyond a predefined position. Moreover, when the nozzle 246 is positioned within the first interface and/or the second interface, the nozzle gasket 248 may be compressed between the first interface and the obstruction 250 and/or the second interface and the obstruction 250. In some examples, the nozzle gasket 248 may be formed from a resilient and/or deformable material so that the nozzle gasket 248 may be compressed and substantially return to its original shape.

In various embodiments, such as the one illustrated in FIG. 10, an energy storage device 220 may be operably coupled with the rod 210 and positioned between the stop 212 and the first portion 190 of the adaptor 72 and/or the first portion 190 of the adaptor 72 and the second portion 192 of the adaptor 72. For example, in the illustrated embodiment, the energy storage device 220 is configured as a compression spring 222 that is disposed about the rod 210 between the second interface 214 and the first portion 190 of the adaptor 72. As such, the spring 222 may be a compression spring configured to urge the second portion 192 of the adaptor 72 towards the first portion 190 of the adaptor 72. In other embodiments, an expansion spring may be disposed about the rod 210 and coupled with the first portion 190 of the adaptor 72 and the second portion 192 of the adaptor 72. Alternatively, any other energy storing device may be used for retainment of the component 12 within the adaptor 72.

In various embodiments, the adaptor 72 may also be additively manufactured to align with the features 78 and/or the general shape of the component 12. For example, in some instances, an operator may designate various features 78 of the component 12 for the one or more channels 76 of the first portion 190 and/or the apertures 218 of the second portion 192 to align with. In turn, an adaptor 72 that aligns with those features 78 may be formed through the apparatus 10 described in FIG. 1 and/or through any other manufacturing process (both additive and/or subtractive). In some examples, once a flow path of the cleaning fluid 70 from the adaptor 72 is determined, a computer aided design (CAD) or similar file may be created of the adaptor 72 and/or the manifold 126. The CAD file of the adaptor 72 and/or the manifold 126 may then be converted into a layer-by-layer format that includes a plurality of build parameters for each layer of the adaptor 72 and/or the manifold 126 to form a build file. After the build file is created, an additive manufacturing apparatus 10 is operated to generate the adaptor 72 and/or the manifold 126 by implementing the layer-by-layer manufacturing process. The exemplary layer-by-layer additive manufacturing process does not use a pre-existing article as the precursor to the final adaptor 72, rather the process produces the adaptor 72 and/or the manifold 126 from a raw material in a configurable form, such as any of the build materials 58 provided herein.

Figure 11:
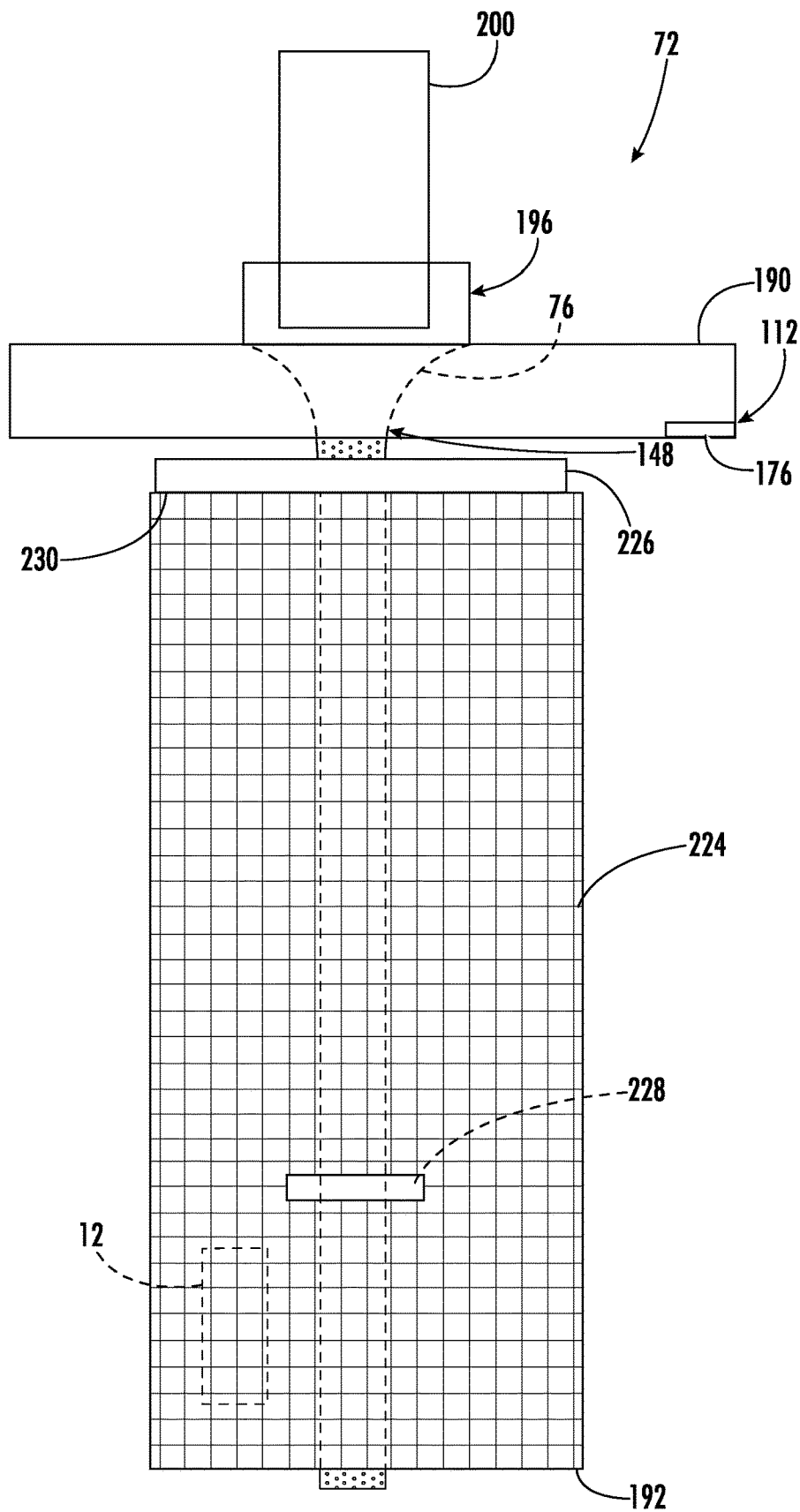
FIG. 11 is a side schematic view of the adaptor configured as a basket that retains the component therein with the basket in a first position in accordance with various aspects of the present disclosure.
Figure 12:
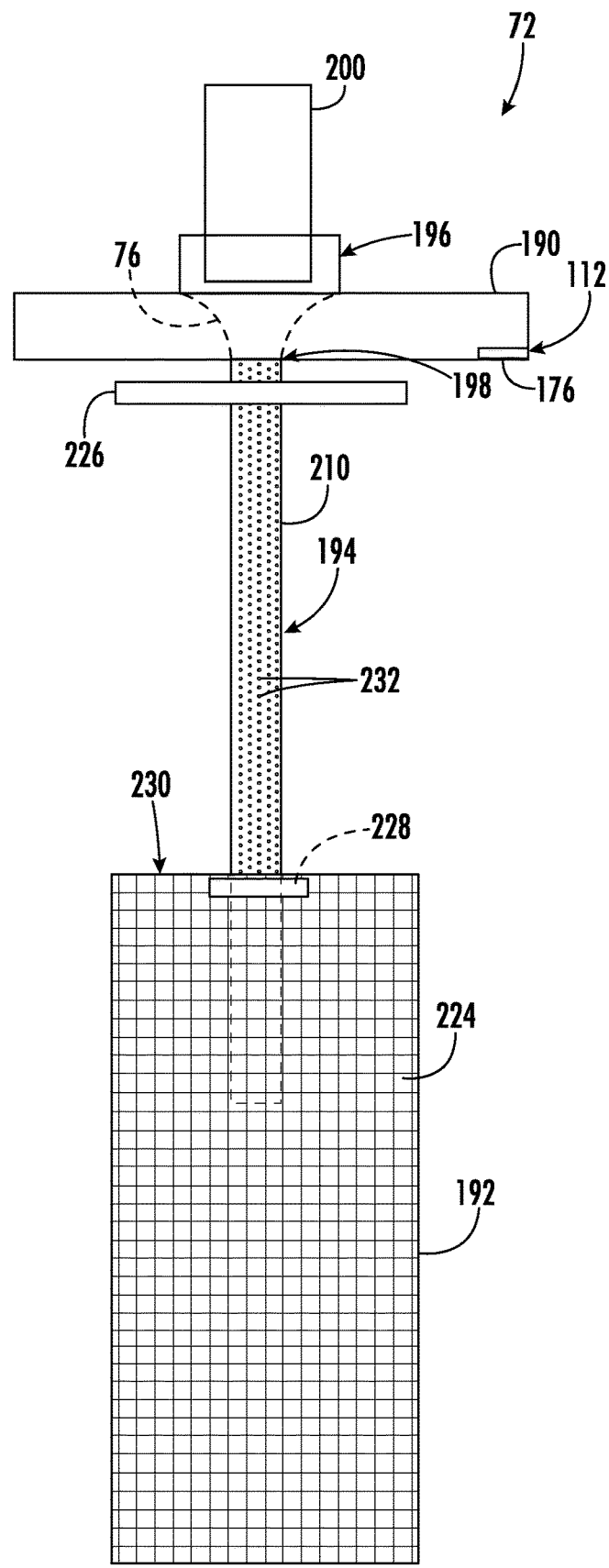
FIG. 12 is a side schematic view of the adaptor configured as a basket that retains the component therein with the basket in a second position in accordance with various aspects of the present disclosure.

Referring now to FIGS. 11 and 12, in some embodiments, the second portion 192 of the adaptor 72 may be configured as a basket 224 or other structure that is configured to retain one or more components 12 therein. As such, the adaptor 72 may be used for a wide range of components 12 rather than each component 12 having a specific adaptor 72.

In some embodiments, such as the one illustrated in FIGS. 11 and 12, the first portion 190 of the adaptor 72 may define the adaptor inlet 196, the adaptor outlet 198, and/or one or more channels 76. The rod 210 of the adjustment assembly 194 may align with the adaptor outlet 198 and include a first stop 226 on an upper portion of the rod 210 of the adjustment assembly 194. The first stop 226 may be positioned on the rod 210 and positioned on an opposing side thereof from the interface 208. A second stop 228 may be positioned below the first stop 226 on the rod 210.

A top portion 230 of the basket 224 may be slidable along the rod 210 between the first and second stops 226, 228. In some instances, the basket 224 may be removably coupled with the first stop 226 such that the first stop 226 forms a top closure (e.g., covers at least a fraction of the top portion 230) of the basket 224. In such instances, one or more components 12 stored within the basket 224 may be accessible when the basket 224 is separated from the first stop 226 and retained within the basket 224 when the basket 224 is coupled to the first stop 226.

In some embodiments, the first or second interface 208, 214 may be connected with a coupler 242 and/or a hose 128 to direct the cleaning fluid 70 (FIG. 3) through a passage 216 defined by the rod 210. The rod 210 may include a plurality of orifices 232 that create a spray along the basket 224, which may be used to clean one or more components 12 within the basket 224. In various embodiments, the orifices 232 could be uniform, or they could be at different angles or have different shapes.

Additionally, or alternatively, the adaptor 72 may be free of components 12 and utilized for moving the cleaning liquid within the tank 62 when the support panel 110 is placed in the second position. In such instances, the cleaning fluid 70 being exhausted through the one or more orifices 232 may create a curtain of fluid driving across the tank floor 66 to sweep particles, such as the residual build material 58, out of the tank 62 through the outlet line 86 thereby preventing the particles of the residual build material 58 from recirculating.

Figure 13:
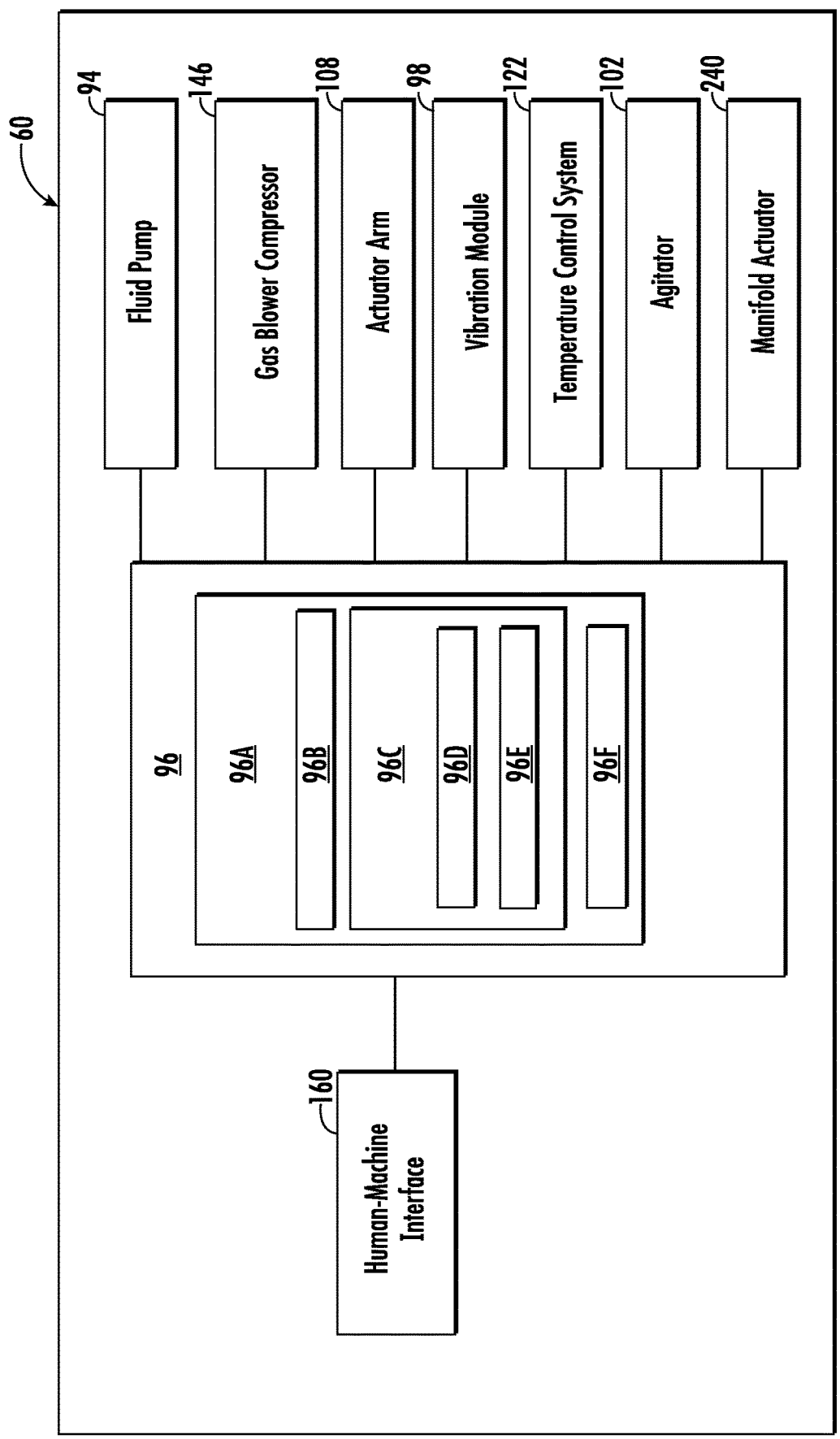
FIG. 13 depicts an exemplary computing system within the cleaning system in accordance with various aspects of the present disclosure.

Referring to FIG. 13, certain components of the cleaning system computing system 96 according to example embodiments of the present disclosure are depicted. The cleaning system computing system 96 can include one or more computing devices 96A which may be used to implement the method 300 such as described herein. The computing devices 96A can include one or more processors 96B and one or more memory devices 96C. The one or more processors 96B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory devices 96C can include one or more non-transitory computer-readable storage mediums, such as RAM, ROM, EEPROM, EPROM, flash memory devices, magnetic disks, etc., and/or combinations thereof.

The memory devices 96C can include one or more computer-readable media and can store information accessible by the one or more processors 96B, including instructions 96D that can be executed by the one or more processors 96B. The instructions 96D may include one or more steps of the method 300 described herein, such as to execute operations of the cleaning system 60 described herein. For instance, the memory devices 96C can store instructions 96D for running one or more software applications, displaying a user interface, receiving user input, processing user input, etc. In some implementations, the instructions 96D can be executed by the one or more processors 96B to cause the one or more processors 96B to perform operations, e.g., such as one or more portions of methods described herein. The instructions 96D can be software written in any suitable programming language or can be implemented in hardware. Additionally, and/or alternatively, the instructions 96D can be executed in logically and/or virtually separate threads on processors 96B.

The one or more memory devices 96C can also store data 96E that can be retrieved, manipulated, created, or stored by the one or more processors 96B. The data 96E can include, for instance, data to facilitate performance of the method 300 described herein. The data 96E can be stored in one or more databases. The one or more databases can be connected to cleaning system computing system 96 by a high bandwidth LAN or WAN or can also be connected to the cleaning system computing system 96 through networks (not shown). The one or more databases can be split up so that they are located in multiple locales. In some implementations, the data 96E can be received from another device.

The computing devices 96A can also include a communication module or interface 96F used to communicate with one or more other modules of the cleaning system computing system 96 or the additive manufacturing apparatus 10 over the networks. The communication interface 96F can include any suitable components for interfacing with one or more networks, including for example, transmitters, receivers, ports, controllers, antennas, or other suitable components.

As provided herein, the cleaning system computing system 96 may be operably coupled with one or more modules of the cleaning system 60, including, but not limited to, the pump 94, the gas blower/compressor 146, the arm actuator 108, the vibration module 98, the temperature control system 122, the agitator 102, and/or the manifold actuator 240. For example, the cleaning system computing system 96 may alter operation of the pump 94 between a first state in which the pump 94 directs fluid through the fluid circuit 84 (FIG. 3) and a second state in which the cleaning fluid is not moved by the pump 94. Likewise, the gas blower/compressor 146 may be actuated between a first state in which a cleaning gas is provided to the manifold 126 and a second state in which the gas blower/compressor 146 does not produce a cleaning gas for the manifold 126. Further, the cleaning system computing system 96 may actuate the arm actuator 108, which moves the support arm (and, possibly, the manifold 126) between various positions. The various positions may include a first position in which a component 12 coupled to the support panel 110 is at least partially above a cleaning liquid within the tank 62 and a second position in which the component 12 coupled to the support panel 110 is at least partially submerged in the cleaning liquid within the tank 62. Each of the vibration module 98, the temperature control system 122, and the agitator 102 may also be actuated between various states through the cleaning system computing system 96.

Figure 14:
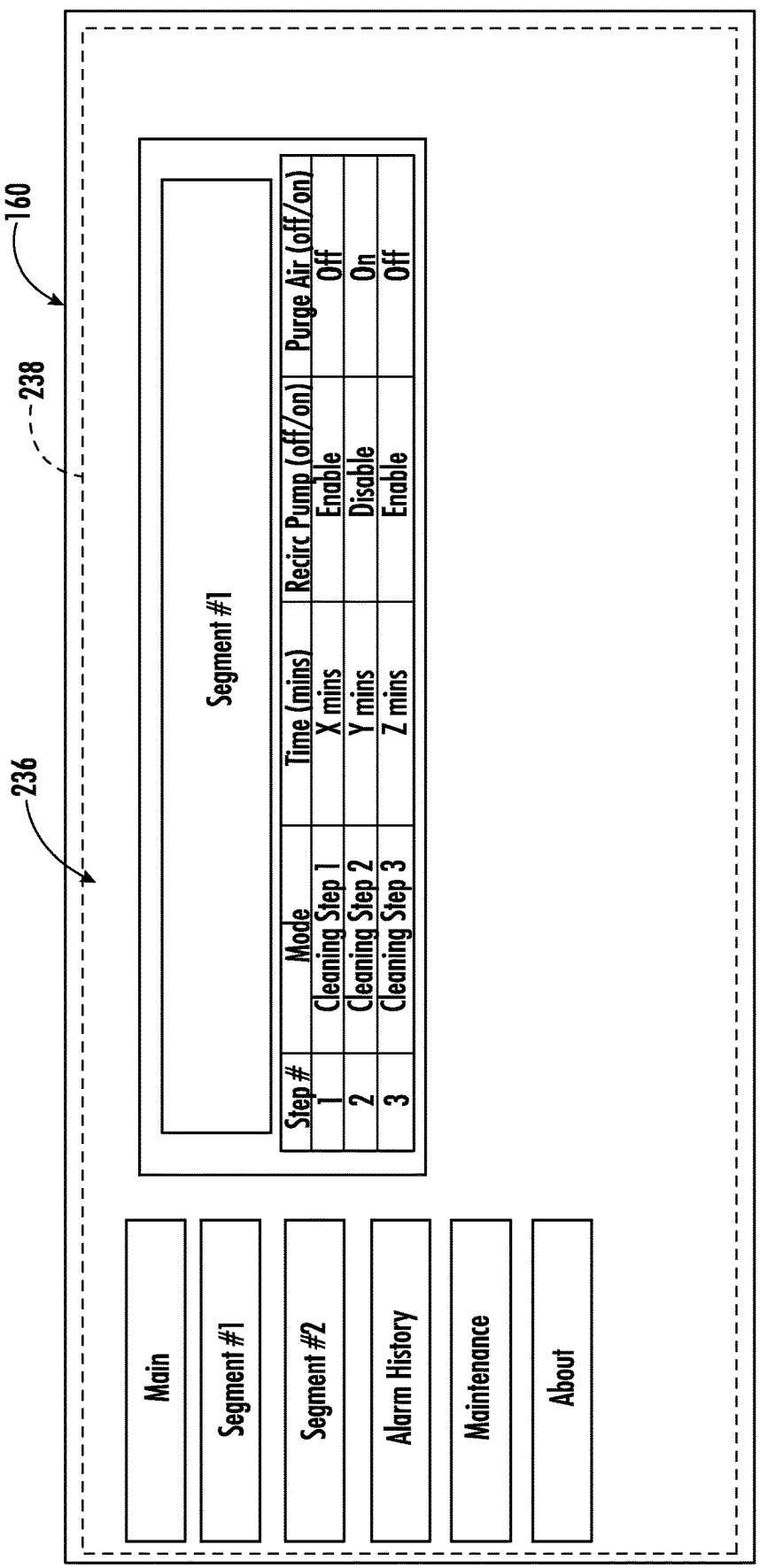
FIG. 14 is an illustration of one display of a human-machine interface (HMI) operably coupled with the cleaning system computing system in accordance with various aspects of the present disclosure.

With reference to FIGS. 13 and 14, the cleaning system computing system 96 may alter the operation of any of the elements of the cleaning system 60. The altering of any operation may be accomplished through the HMI 160 that is operably coupled with the cleaning system computing system 96. In some examples, the HMI 160 may include a display 236 having a touchscreen 238. The display 236 may be capable of displaying information related to the cleaning system 60 or any other information. In some embodiments, the HMI 160 may include a user-input device in the form of circuitry within the touchscreen 238 to receive an input corresponding with a location over the display 236. Other forms of input, including one or more joysticks, input pads, or the like can be used in place or in addition to the touchscreen 238. In some instances, a predefined cleaning pattern may be set, either as an initial/default pattern or as an operator defined pattern through the touchscreen 238 and/or any other user-input device.

As illustrated, the HMI 160 may be used to define a cleaning pattern for each segment 156, 158 of the manifold 126. Within each segment 156, 158, an order of cleaning processes may be defined along with a duration for each of the cleaning processes. The one or more processes that may individually or in combination remove at least a portion of the residual build material 58 from the component 12. For example, the various cleaning processes can include flushing a cleaning fluid 70 (FIG. 3), which may be in the form of a liquid and/or a gas, along the component 12 and/or within one or more features 78 (FIG. 10) of the component 12. The various cleaning processes may further include at least partially submerging the component 12 within the cleaning fluid 70 to remove the residual build material 58. Still further, with the component 12 at least partially submerged, the cleaning fluid 70 may be vibrated for separating the residual build material 58 from the component 12. The processes may be implemented in any order for any amount of time based on the component 12 to be cleaned.

Now that the construction and configuration of the additive manufacturing apparatus having one or more accumulators have been described according to various examples of the present subject matter, a method 300 for operating an additive manufacturing apparatus is provided. The method 300 can be used to operate the additive manufacturing apparatus and the one or more accumulators, or any other suitable additive manufacturing apparatus having any type and configuration of positioning assembly. It will be appreciated that the example method 300 is discussed herein only to describe example aspects of the present subject matter and is not intended to be limiting.

Figure 15:
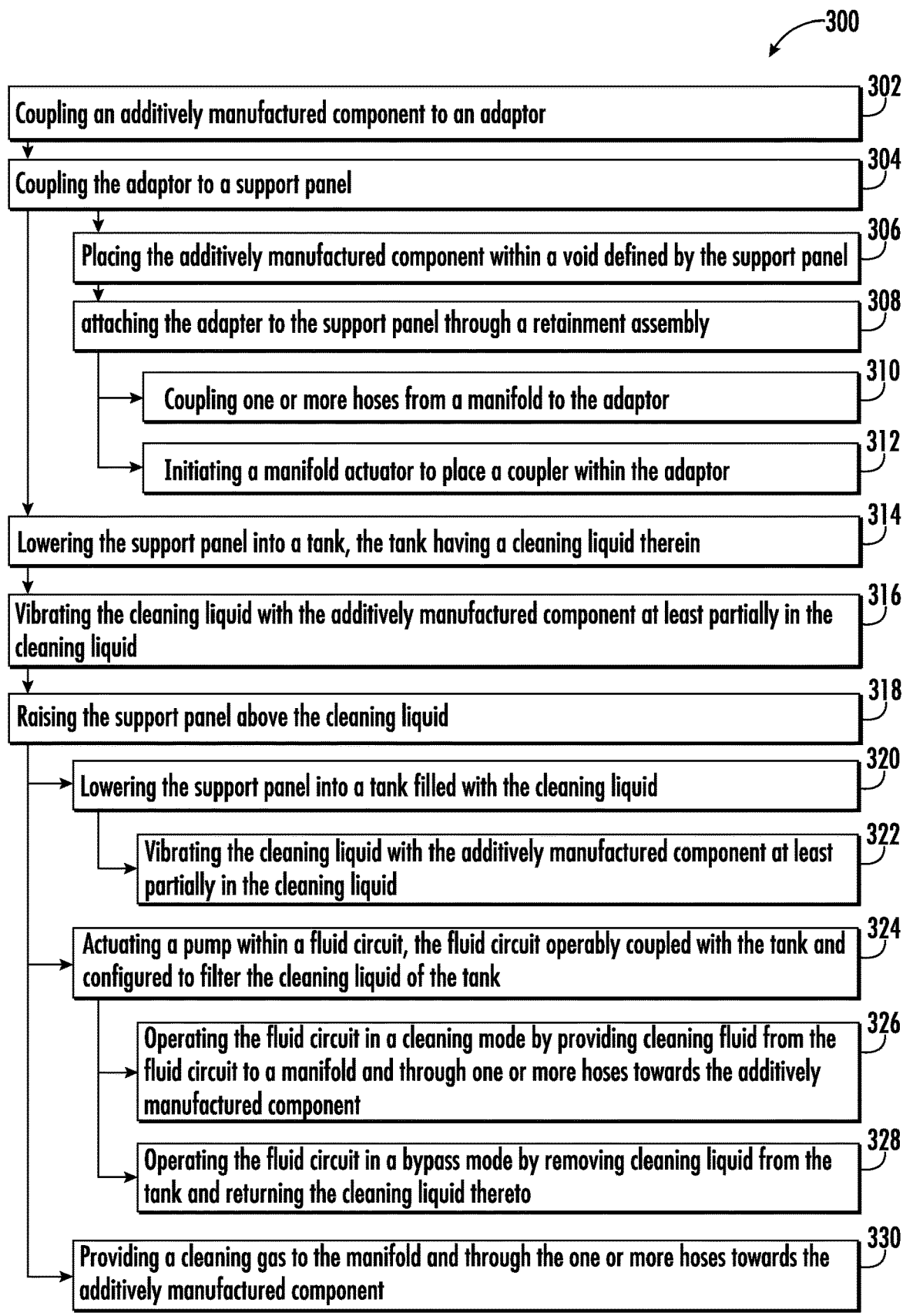
FIG. 15 is a method of operating the cleaning system in accordance with various aspects of the present disclosure.

Referring now to FIG. 15, the method 300 includes, at step 302, coupling an additively manufactured component to an adaptor. As provided herein, the adaptor may include a first portion and a second portion separated from the first portion. An adjustment assembly can be operably coupled with the second portion and configured to alter a distance between the first portion and the second portion.

Once the component is coupled with the adaptor, the method, at step 304, can include coupling the adaptor to a support panel of the cleaning system. In various embodiments, the coupling of the adaptor may include, at step 306, placing the additively manufactured component within a component void defined by the support panel. In some instances, at step 308, the method includes attaching the adaptor to the support panel through a retainment assembly. In some examples, the retainment assembly may include one or more magnets embedded within the first portion of the adaptor that are configured to magnetically couple the first portion to a support panel. In other examples, the attaching of the adaptor to the support panel through a retainment assembly may include resting the first portion of the adaptor on the support panel and/or utilizing any other retainment device, such as a clamp, clip, and the like.

Next, at step 310, the method includes coupling one or more hoses from a manifold to the adaptor. Additionally, or alternatively, as step 312, the method includes initiating a manifold actuator to place a coupler within the adaptor. Once the manifold is fluidly coupled with the adaptor at step 310 and/or step 312, the manifold may direct a cleaning fluid from the manifold, through the adaptor, and into one or more features of the component and/or along various portions of the component. Through actuation of various valves within a solenoid bank within the manifold, each adaptor may receive a cleaning liquid, a cleaning gas, and/or a mixed cleaning fluid, which may create a foam in which the cleaning liquid includes bubbles generated by the cleaning gas.

At step 314, the method includes lowering the support panel into a tank with the tank having a cleaning liquid therein. In various examples, the support panel may be moved by an arm actuator that supports the support panel and, in some cases, the manifold. In various examples, the arm actuator moves the support panel at least between a first position in which the support panel is a first distance from a tank floor and a second position in which the support panel is a second distance from a tank floor. The second distance being less than the first distance. In some cases, when the support panel is placed in the second position, the component is at least partially submerged within the cleaning fluid that is retained within the tank.

At step 316, the method includes vibrating the cleaning liquid with the additively manufactured component at least partially in the cleaning liquid. The vibration of the cleaning liquid may be created by a vibration module that is in the form of any suitable vibratory transducer. For example, the vibration module can include a pneumatic vibration module that creates movement of the cleaning liquid within the tank.

Once the component has been at least partially submerged in the cleaning liquid for a predefined duration, the method, at step 318, includes raising the support panel above the cleaning liquid. Once the support panel is lifted, possibly back to the first position, the method can include lowering the support panel into the tank filled with the cleaning liquid at step 320. Once the component is again at least partially submerged, the method, at step 322, includes vibrating the cleaning liquid with the additively manufactured component at least partially in the cleaning liquid.

By completing steps 302-322, an inside portion of the component can be cleaned while submerged due to the vibrating and submerging of the component within the cleaning liquid, which may also be referred to as a macro cleaning. In addition, the cleaning liquid can be disposed within a bottom portion of the component, even with the adaptor as the adaptor may not completely seal the features of the component. As such, the cleaning liquid may get inside the one or more features. When the component is moved to a position above the tank, the cleaning liquid may be drained from the component. As such, when the component is at least partially submerged into the tank at step 320, air (or gas) within the component may get displaced by the cleaning liquid thereby forcing cleaning of the component and/or removal of the residual build material from the component through altering cleaning gas and cleaning fluid within the component.

In addition to or in lieu of lowering the support panel back into the tank filled with the cleaning liquid at step 320, the method, at step 324, can include actuating a pump within a fluid circuit. The fluid circuit can be operably coupled with the tank and configured to filter the cleaning liquid of the tank as the cleaning liquid is directed therethrough. In some instances, the method, at step 326, can include operating the fluid circuit in a cleaning mode by providing cleaning liquid from the fluid circuit to a manifold and towards the additively manufactured component. In some instances, the cleaning liquid passed through the manifold and to the component is at a sufficiently low pressure that the cleaning liquid may not be capable of moving through the one or more features while the component is at least partially submerged. The low pressure may be used to maintain the integrity of the component.

In some instances, while operating the fluid circuit in the cleaning mode, a pressure gauge may measure a pressure within the manifold. In some instances, if a pressure is greater than a predefined value, the back pressure may be predicted to be a clog within the component and/or one or more channels within the adaptor are misaligned with the component. In either situation, an HMI may provide a notification of the pressure exceeding the predefined value.

Further, the method, at step 328, can include operating the fluid circuit in a bypass mode by removing cleaning liquid from the tank and returning the cleaning liquid thereto. The cleaning liquid may be returned to the tank through a bypass pipe that is operably coupled with the fluid circuit that directs at least a portion of the cleaning liquid to the tank rather than the manifold. While operating in the bypass mode, one or more filters within the fluid circuit may intermittently or continuously filter the cleaning liquid. In some instances, the cleaning mode provided in step 326 and the by-pass mode provided in step 328 may be conducted simultaneously.

In addition to or in lieu of lowering the support panel back into the tank filled with the cleaning liquid at step 320 and/or actuating a pump within a fluid circuit at step 324, the method, at step 330, can include providing a cleaning gas to the manifold and towards the additively manufactured component. The cleaning gas may be provided from the gas supply. In some instances, the gas supply may include a gas supply in the form of process gas from a device of the cleaning system and/or from a blower/compressor. The gas may then be directed through a filter and a regulator to ensure that the gas is directed to the manifold at a predefined volume and/or pressure. The pressure may be determined based on the features of the component to ensure that the residual build material may be separated from the component while maintaining the integrity of the component.

It will be appreciated that the steps, the duration of each step, the pressure of the cleaning gas being introduced into the part, and/or the pressure of the cleaning liquid being introduced into the part can be modified based on predefined algorithms within the cleaning system computing system and/or via the HMI that is operably coupled with the cleaning system computing system. In various embodiments, a maximum cleaning duration is determined based on the amount of time that the component may be in contact with the cleaning liquid before the component starts to lose structural integrity. Based on the maximum amount of time, the number of cleaning processes and/or the duration of each step may be adjusted.

It will be appreciated that the cleaning system is described herein only for the purpose of explaining aspects of the present subject matter. In other example embodiments, the cleaning system may have any other suitable configuration and may use any other technology. Further, the cleaning system and processes or methods described herein may be used for cleaning components formed from any suitable material. For example, the material may be plastic, metal, concrete, ceramic, polymer, epoxy, photopolymer resin, or any other suitable material. For example, according to various embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein and may be generally referred to as "additive materials" that create the residual build material described herein.

Further aspects are provided by the subject matter of the following clauses:

A cleaning system for an additively manufactured component, the cleaning system comprising: a tank configured to store a cleaning liquid; a fluid circuit operably coupled with the tank; a pump coupled with the fluid circuit; a manifold configured to receive fluid from the fluid circuit through the pump; and at least one of a coupler defined by the manifold or a hose coupled with the manifold, wherein the at least one of the coupler defined by the manifold or the hose is configured to couple with said additively manufactured component.

The cleaning system of one or more of these clauses, further comprising: a filter system within the fluid circuit, the filter system configured to remove a residual build material from the cleaning liquid before the cleaning liquid is directed to the manifold.

The cleaning system of one or more of these clauses, further comprising: an arm actuator supporting a support panel and the manifold, wherein the arm actuator moves the support panel between a first position in which the support panel is a first distance from a tank floor and a second position in which the support panel is a second distance from the tank floor, the second distance being less than the first distance.

The cleaning system of one or more of these clauses, wherein the manifold includes independently controllable first and second segments.

The cleaning system of one or more of these clauses, further comprising: a vibration module operably coupled with the tank and configured to oscillate the cleaning liquid at a predefined frequency when a support panel is positioned within the cleaning liquid.

The cleaning system of one or more of these clauses, further comprising: a gas supply operably coupled with the manifold, the gas supply configured to provide a high volume, low pressure cleaning gas to the manifold.

The cleaning system of one or more of these clauses, wherein the at least one of a coupler defined by the manifold or the hose are coupled with the additively manufactured component through an adaptor, the adaptor comprising: a first portion defining an adaptor inlet, an adaptor outlet, one or more channels extending between the adaptor inlet and the adaptor outlet, and an adjustment assembly void; a second portion separated from the first portion; and an adjustment assembly operably coupled with the second portion and positioned through the adjustment assembly void, wherein the adjustment assembly is configured to alter a distance between the first portion and the second portion.

The cleaning system of one or more of these clauses, further comprising: a spring operably coupled with the adaptor and configured to urge the second portion of the adaptor towards the first portion of the adaptor.

The cleaning system of one or more of these clauses, further comprising: one or more magnets embedded within the first portion of the adaptor and configured to magnetically couple the first portion to a support panel.

The cleaning system of one or more of these clauses, wherein the additively manufactured component is configured to be retained between the adaptor outlet of the first portion of the adaptor and the second portion of the adaptor.

The cleaning system of one or more of these clauses, wherein the cleaning liquid is provided from the tank, through the adaptor outlet, and into a feature of the additively manufactured component.

A method of cleaning an additive manufacturing component, the method comprising: coupling an additively manufactured component to an adaptor; fluidly coupling a manifold to the adaptor; lowering a support panel into a tank, the tank having a cleaning liquid therein; vibrating the cleaning liquid with the additively manufactured component at least partially in the cleaning liquid; and raising the support panel above the cleaning liquid.

The method of one or more of these clauses, wherein coupling the adaptor to the support panel further comprises: placing the additively manufactured component within a component void defined by the support panel; attaching the adaptor to the support panel through a retainment assembly; and coupling the manifold to the adaptor.

The method of one or more of these clauses, further comprising: operating a fluid circuit in a cleaning mode by providing cleaning fluid from the fluid circuit to the manifold and towards the additively manufactured component.

The method of one or more of these clauses, further comprising: providing a cleaning gas to the manifold and towards the additively manufactured component.

An adaptor for a cleaning system for additively manufactured components, the adaptor comprising: a first portion defining an adaptor inlet, an adaptor outlet, one or more channels extending between the adaptor inlet and the adaptor outlet, and an adjustment assembly void; a second portion separated from the first portion through an adjustment assembly; and an energy device operably coupled with the adjustment assembly and configured to urge the second portion towards the first portion.

The adaptor of one or more of these clauses, wherein the adjustment assembly is configured to alter a distance between the first portion and the second portion.

The adaptor of one or more of these clauses, further comprising: one or more magnets embedded within the first portion and configured to magnetically couple the first portion to a support panel of said cleaning system.

The adaptor of one or more of these clauses, further comprising: an adaptor gasket positioned within the adaptor outlet of the first portion.

The adaptor of one or more of these clauses, wherein a fluid is provided through a manifold, the adaptor, and a feature of the additively manufactured component.

This written description uses examples to disclose the concepts presented herein, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cleaning system for an additively manufactured component, the cleaning system comprising:
   a tank configured to store a cleaning liquid;
   a fluid circuit operably coupled with the tank;
   a pump coupled with the fluid circuit;
   a manifold configured to receive fluid from the fluid circuit through the pump;
   at least one of a coupler defined by the manifold or a hose coupled with the manifold, wherein the at least one of the coupler defined by the manifold or the hose is configured to couple with said additively manufactured component; and
   an adaptor configured to operably couple the additively manufactured component with the at least one of a coupler defined by the manifold or the hose, the adaptor comprising:
   a first portion defining an adaptor inlet, an adaptor outlet, one or more channels extending between the adaptor inlet and the adaptor outlet, and an adjustment assembly void;
   a second portion separated from the first portion; and
   an adjustment assembly operably coupled with the second portion and positioned through the adjustment assembly void, wherein the adjustment assembly is configured to alter a distance between the first portion and the second portion.

2. The cleaning system of claim 1, further comprising:
   a filter system within the fluid circuit, the filter system configured to remove a residual build material from the cleaning liquid before the cleaning liquid is directed to the manifold.

3. The cleaning system of claim 1, wherein the manifold includes independently controllable first and second segments.

4. An adaptor for a cleaning system for additively manufactured components, the adaptor comprising:
   a first portion defining an adaptor inlet, an adaptor outlet, one or more channels extending between the adaptor inlet and the adaptor outlet, and an adjustment assembly void;
   a second portion separated from the first portion through an adjustment assembly; and
   an energy device operably coupled with the adjustment assembly and configured to urge the second portion towards the first portion.

5. The adaptor for the cleaning system of claim 4, wherein the adjustment assembly is configured to alter a distance between the first portion and the second portion.

6. The adaptor for the cleaning system of claim 4, wherein a fluid is provided through a manifold, the adaptor, and a feature of the additively manufactured component.

7. An adaptor for a cleaning system for additively manufactured components, the adaptor comprising:
   a first portion defining an adaptor inlet, an adaptor outlet, one or more channels extending between the adaptor inlet and the adaptor outlet, and an adjustment assembly void;
   a second portion separated from the first portion through an adjustment assembly, wherein the adjustment assembly is configured to alter a distance between the first portion and the second portion.

8. The adaptor for the cleaning system of claim 7, further comprising:
   an energy device operably coupled with the adjustment assembly and configured to urge the second portion towards the first portion.

9. The adaptor for the cleaning system of claim 7, wherein a fluid is provided through a manifold, the adaptor, and a feature of an additively manufactured component.

10. The adaptor for the cleaning system of claim 7, wherein the first portion is configured to operably couple with a fluid circuit operably coupled with a tank configured to store a cleaning liquid.

11. The adaptor for the cleaning system of claim 10, wherein the fluid circuit is configured to operably couple with a pump.

12. The adaptor for the cleaning system of claim 10, wherein the fluid circuit further comprises:
   a manifold configured to receive fluid from the fluid circuit through the pump; and
   at least one of a coupler defined by the manifold or a hose coupled with the manifold, wherein the at least one of the coupler defined by the manifold or the hose is configured to couple with an additively manufactured component through the first portion of the adaptor.

13. The adaptor for the cleaning system of claim 12, further comprising
a filter system within the fluid circuit, the filter system configured to remove a residual build material from the cleaning liquid before the cleaning liquid is directed to the manifold.

14. The adaptor for the cleaning system of claim 12, wherein the manifold includes independently controllable first and second segments.

* * * * *